(12) United States Patent
Smith et al.

(10) Patent No.: US 12,509,247 B2
(45) Date of Patent: Dec. 30, 2025

(54) INDEXING FOR AIRFRAMES UNDERGOING PULSED-LINE ASSEMBLY

(71) Applicant: The Boeing Company, Arlington, VA (US)

(72) Inventors: Daniel R. Smith, Woodinville, WA (US); Darrell D. Jones, Mill Creek, WA (US); Frederick M. Swanstrom, Normandy Park, WA (US)

(73) Assignee: The Boeing Company, Arlington, VA (US)

( * ) Notice: Subject to any disclaimer, the term of this patent is extended or adjusted under 35 U.S.C. 154(b) by 29 days.

(21) Appl. No.: 18/417,819

(22) Filed: Jan. 19, 2024

(65) Prior Publication Data

US 2024/0158097 A1    May 16, 2024

Related U.S. Application Data

(62) Division of application No. 17/454,263, filed on Nov. 10, 2021, now Pat. No. 11,926,435.

(60) Provisional application No. 63/115,059, filed on Nov. 18, 2020.

(51) Int. Cl.
*B23P 23/00* (2006.01)
*B23P 21/00* (2006.01)
*B64C 1/06* (2006.01)
*B64F 5/10* (2017.01)

(52) U.S. Cl.
CPC .............. *B64F 5/10* (2017.01); *B23P 21/004* (2013.01); *B64C 1/068* (2013.01); *B23P 2700/01* (2013.01)

(58) Field of Classification Search
CPC .. B64F 5/10; B64F 5/50; B23P 21/004; B23P 2700/01; B64C 1/068; B64C 1/069
See application file for complete search history.

(56) References Cited

U.S. PATENT DOCUMENTS

| 6,121,781 A | 9/2000 | Martinez |
| 6,429,016 B1 | 8/2002 | McNeil |
| 2011/0301735 A1 | 12/2011 | Eickhorst |
| 2013/0019446 A1 | 1/2013 | Venskus et al. |

(Continued)

FOREIGN PATENT DOCUMENTS

| DE | 712525 C | 10/1941 |
| DE | 1010836 B | 6/1957 |

(Continued)

OTHER PUBLICATIONS

English translation of JP-58199277-A (Year: 1983).*

(Continued)

*Primary Examiner* — Jun S Yoo
(74) *Attorney, Agent, or Firm* — Yee & Associates, P.C.

(57) ABSTRACT

Systems and methods are provided for assembling a structure. The systems and method including micro pulsing a structure along a track in a process direction by less than a length of the structure. The structure is indexed to one or more work stations by mating indexing features in a manufacturing excess of the structure to complementary features at the work stations. The work stations would the perform work on the structure at the work stations while the structure is indexed to the work stations. Iteratively repeating the micro pulsing and indexing and working upon the structure until it is ready to advance to the next assembly process.

56 Claims, 24 Drawing Sheets

(56) References Cited

U.S. PATENT DOCUMENTS

| | | | |
|---|---|---|---|
| 2014/0172223 A1* | 6/2014 | Murphy | G05D 1/0289 701/25 |
| 2015/0314889 A1 | 11/2015 | Day et al. | |
| 2016/0158940 A1* | 6/2016 | Brockway | B25J 9/1687 901/41 |
| 2016/0354883 A1 | 12/2016 | Vogt et al. | |
| 2019/0143399 A1 | 5/2019 | Kasahara et al. | |
| 2021/0171181 A1 | 6/2021 | Hirai et al. | |
| 2022/0234761 A1 | 7/2022 | Bonnefoy | |

FOREIGN PATENT DOCUMENTS

| | | | | |
|---|---|---|---|---|
| DE | 102005002546 A1 | 8/2006 | | |
| EP | 3287247 A1 | 8/2020 | | |
| GB | 2352692 A * | 2/2001 | | B62D 65/02 |
| JP | 58199277 A * | 11/1983 | | |
| WO | 03037564 A2 | 5/2003 | | |

OTHER PUBLICATIONS

European Patent Office Extended Search Report, dated Apr. 20, 2022, regarding Application No. EP21207535.2, 9 pages.

European Patent Office Extended Search Report, dated Sep. 25, 2023, regarding Application No. EP23167699.0, 7 pages.

Netherlands Patent Office Written Opinion and Search Report with English Translation, dated Jul. 19, 2021, regarding Application No. NL2027416, 18 pages.

Notice of Allowance, dated Nov. 17, 2023, regarding U.S. Appl. No. 17/454,263, 12 pages.

Office Action, dated Jun. 8, 2023, regarding U.S. Appl. No. 17/454,263, 30 pages.

* cited by examiner

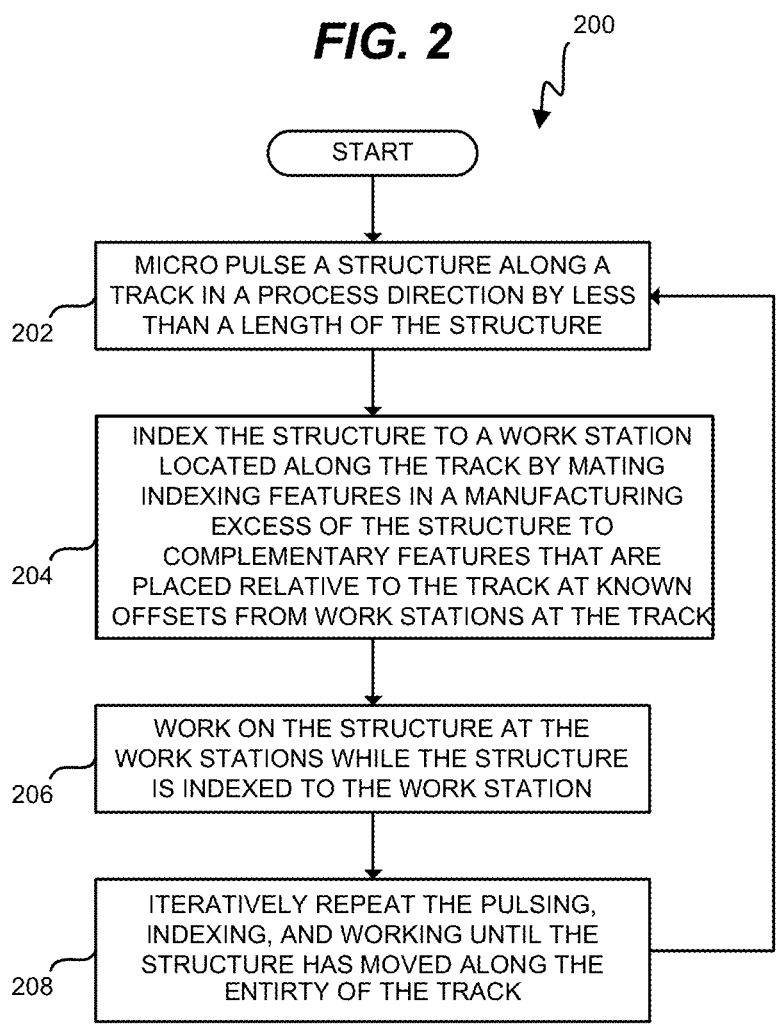

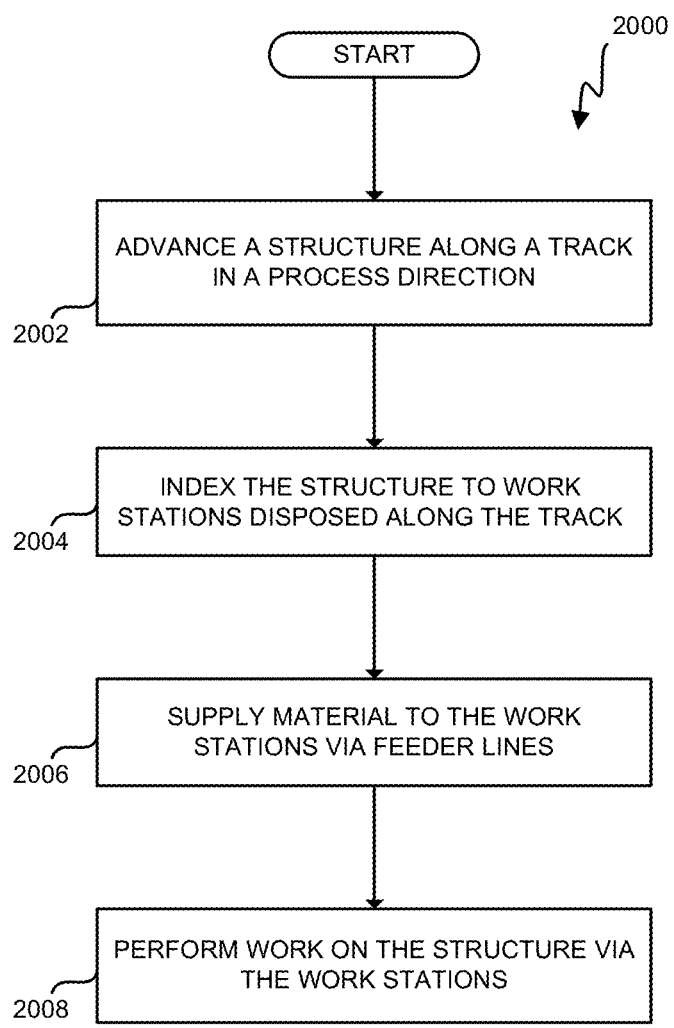

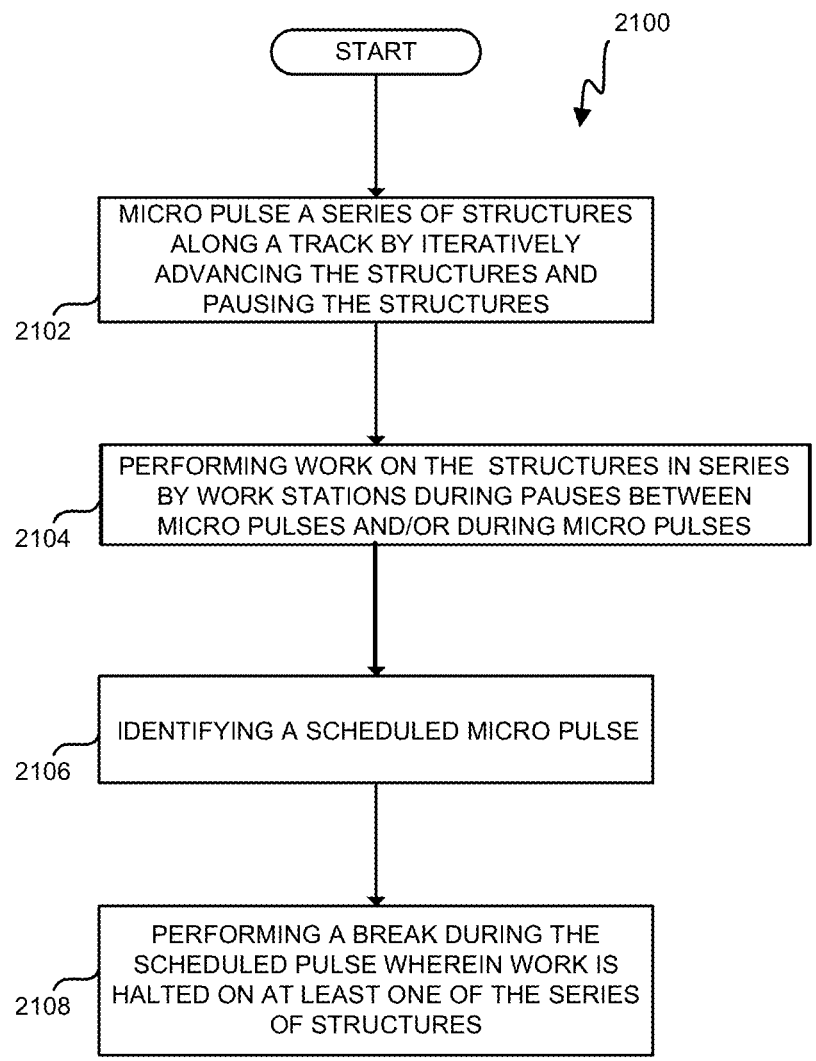

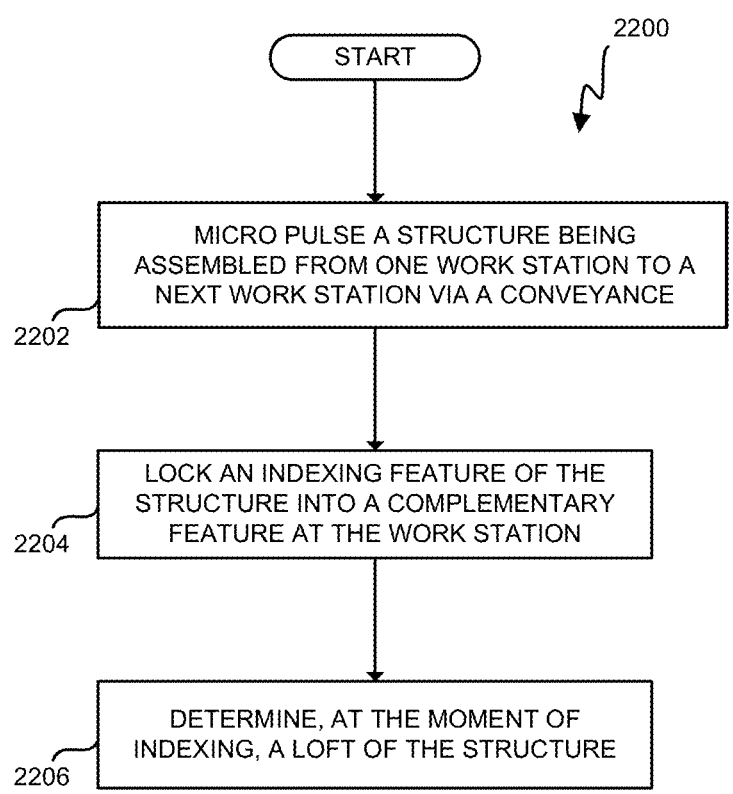

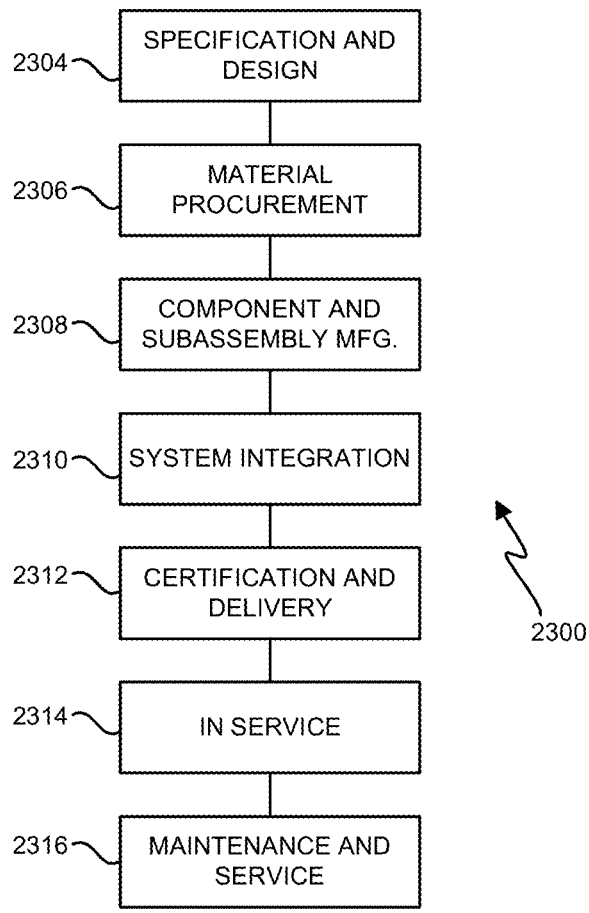
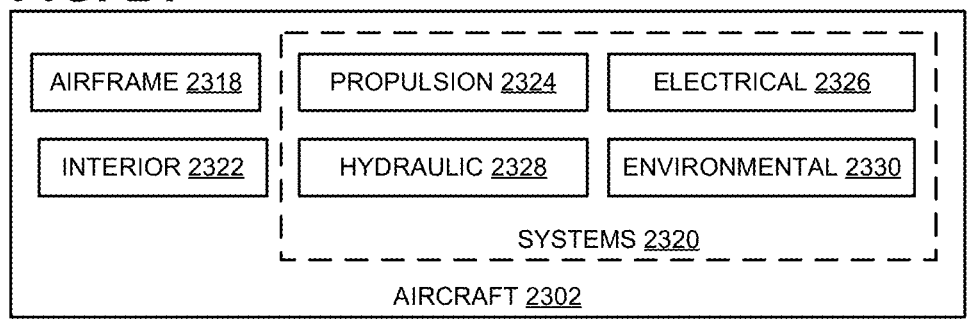

INDEXING FOR AIRFRAMES UNDERGOING PULSED-LINE ASSEMBLY

CROSS-REFERENCE TO RELATED APPLICATION

This application is a Divisional of U.S. patent application Ser. No. 17/454,263, filed Nov. 10, 2021, and entitled "Indexing For Airframes Undergoing Pulsed-Line Assembly," which claims the benefit of U.S. Provisional Patent Application Ser. No. 63/115,059, filed Nov. 18, 2020, and entitled "Indexing For Airframes Undergoing Pulsed-Line Assembly;" both of which are incorporated herein by reference in their entirety.

FIELD

The disclosure relates to the field of assembly, and in particular, to assembly of airframes.

BACKGROUND

An airframe defines the mechanical structure of an aircraft. Airframes are made of multiple components that provide desired structural properties. For example, a portion of an airframe for a fuselage of an aircraft may include frames, skin, and stringers that are mechanically coupled together (e.g., via co-bonding, co-curing, or fasteners) in accordance with design parameters. As presently practiced, components of an airframe are fabricated and assembled in predefined cells on a factory floor. For example, components may be laid-up, cured, or otherwise fabricated at one cell, and then may be transported in their entirety to a new cell where work is performed.

While the fabrication processes discussed above are reliable, they encounter delays when work at a specific portion of a component is completed more slowly than expected. For example, if a particular portion of a fuselage section takes longer than expected to be fastened or laid-up, then the entire section often remains at the cell until all of the work that has been delayed is completed. Furthermore, after a component has been moved, a great deal of time is spent cataloging the configuration of the component. This time is not value-added time. Furthermore, frequent moves between cells add a substantial amount of time that is not value-added. That is, each movement of a part between cells (and hence, each cell used in the fabrication process) results in setup time, and this setup time should be minimized to enhance efficiency. Current designs utilize automated optical inspection techniques and/or probes to inspect position of parts along six degrees of freedom across their dimensions, but these are particularly time-consuming and expensive processes.

Therefore, it would be desirable to have a method and apparatus that take into account at least some of the issues discussed above, as well as other possible issues.

SUMMARY

According to an aspect of the present disclosure, a method for assembling a structure the method comprising: micro pulsing a structure along a track in a process direction by less than a length of the structure; indexing the structure to work stations by mating indexing features in a manufacturing excess of the structure to complementary indexing features at the work stations; working on the structure at the work stations while the structure is indexed to the work stations; and iteratively repeating the micro pulsing and indexing and working upon the structure.

Advantageously, the method wherein indexing the structure to work stations is performed such that multiple work stations are indexed to the structure at once.

Preferably, the method wherein indexing the structure to work stations conveys multiple instructions at the same time to one or multiple work stations.

Preferably, the method wherein indexing the structure to work stations conveys a 3D characterization and/or IML loft and/or OML loft of the structure within the purview of the work station.

Preferably, the method wherein indexing the structure to work stations conveys a digitization of the structure within the purview of the work station.

Preferably, the method wherein indexing the structure to work stations conveys assembly instructions for the structure within the purview of the work station to the work station.

Preferably, the method of claim 1 wherein the work stations perform work during a pause between micro pulses of the structure.

Preferably, the method wherein the work stations perform work during a micro pulse of the structure.

Preferably, the method wherein indexing the structure to the work stations comprises inserting pins into holes that have been placed into or onto the structure at predefined intervals.

Preferably, the method wherein indexing the structure to the work stations comprises inserting pins into holes that have been machined into the structure at predefined intervals.

Preferably, the method wherein indexing the structure to the work stations comprises scanning RFID tags or bar codes placed upon the structure at predefined intervals.

Preferably, the method wherein the indexing features are disposed in a manufacturing excess of the structure and the method further comprises trimming the manufacturing excess and the indexing features from the structure.

Preferably, the method wherein micro pulsing the structure exposes a new portion of the structure for receiving work by the work stations.

Preferably, the method wherein the work stations are disposed along the track and are separated by less than the length of the structure.

Preferably, the method of further comprising micro pulsing additional structures along the track by less than the length of the structure.

Preferably, the method wherein working on the structure at the work stations while the structure is indexed and performed by the work stations during a pause between micro pulses of the structure.

Preferably, the method wherein working on the structure at the work stations between indexing and performed by the work stations during a micro pulse of the structure.

Preferably, the method wherein micro pulsing the additional structures comprises micro pulsing additional structures that are immediately upstream and/or downstream of the structure.

Preferably, the method wherein micro pulsing the additional structures disposed serially along the track and separated by a gap.

Preferably, the method wherein micro pulsing the additional structures comprises maintaining gaps between the additional structures.

Preferably, the method further comprising periodically standing down work stations when work is not needed to be performed by it on the structure within its purview.

Preferably, the method further comprising performing maintenance at a work station disposed at one of the gaps during a pause between micro pulses of the additional structures.

Preferably, the method wherein each of the gaps comprises a multiple of a micro pulse length for the structure.

Preferably, the method wherein the structure is micro pulsed a distance equal to a multiple of a frame pitch distance.

Preferably, the method wherein micro pulsing the structure comprises iteratively advancing it by less than a length of the structure and pausing.

Preferably, the method wherein different messages are conveyed to work stations by the indexing features based upon at least a shape, type or location of the indexing feature at the structure the indexing features are customized to provide instructions on operations to be performed within a purview of a work station.

Preferably, the method wherein multiple instructions are conveyed at the same time to multiple work stations via the singular or multiple indexing features.

Preferably, the method wherein the work stations being indexed to the structure at the same time, and work is performed by the work stations at the same time to modify the structure.

Preferably, the method wherein the complementary features are located relative to the work stations.

A portion of an aircraft assembled according to the method described above.

According to an aspect of the present disclosure, a system for assembling structures the system comprising: a track that transports structures comprising indexing features; an array of work stations disposed along the track that perform work on the structures and that are separated from each other in a process direction by less than a length of each of the structures; and indexing units that are disposed relative to the work stations along the track at known offsets from corresponding work stations in the array, and that comprise complementary indexing features that are located relative to the track the complementary indexing features being dimensioned to mate with the indexing features.

Advantageously, the system wherein the indexing features are placed in a manufacturing excess of the structures and the work stations remove the manufacturing excess.

Preferably, the system comprising the indexing features convey a 3D characterization and/or Inner Mold Line (IML) loft and/or Outer Mold Line (OML) loft of the structure within the purview of the work station to the work station.

Preferably, the system comprising the indexing features convey a digitization of the structure within the purview of the work station to the work station.

Preferably, the system comprising the indexing features conveys assembly instructions for the structure within the purview of the work station to the work station.

Preferably, the system wherein the track comprises a series of stanchions that include rollers at predefined locations for receiving the structures.

Preferably, the system wherein the indexing features are selected from the group consisting of: through-holes, blind holes, slots, pin, RFID tags and/or bar codes that have been coupled to the structure at predefined intervals.

Preferably, the system wherein each of the work stations perform a type of work selected from the group consisting of: installing frames, installing stringers, installing door surrounds, installing window surrounds, cutting window holes, and cutting door holes.

Preferably, the system wherein different messages are conveyed to work stations based upon at least a shape or location of the indexing features.

Preferably, the system wherein the work stations perform work on the structure at the same time.

Preferably, the system wherein the structures are separated by gaps that each comprise a multiple of a micro pulse length.

Preferably, the system wherein the structures are micro pulsed a distance equal to a multiple of a frame pitch distance.

Fabricating a portion of an aircraft using the system as described above.

According to an aspect of the present disclosure, a n apparatus for assembling structures the apparatus comprising: a track that advances a structure in a process direction; at least one work station disposed along the track; and indexing units that are disposed relative to the at least one work station.

Advantageously, the apparatus wherein: the indexing units are disposed at offsets from corresponding at least one work station.

Preferably, the apparatus wherein the indexing units include complementary indexing features that couple with indexing features at structures that receive work from the work stations.

Preferably, the apparatus wherein the complementary indexing features are dimensioned to mate with the indexing features in a manufacturing excess of the structures.

Preferably, the apparatus wherein at the at least one work station comprises multiple work stations and the multiple work stations are arrayed serially along a structure that progresses along the track.

Fabricating a portion of an aircraft using the apparatus as described above.

According to an aspect of the present disclosure, a method for assembling a structure the method comprising: micro pulsing a structure along a track in a process direction by less than a length of the structure; indexing the structure to work stations by mating indexing features in a manufacturing excess of the structure to complementary indexing features at the work stations; and iteratively repeating the micro pulsing and indexing the structure.

Advantageously, the method wherein working on the structure at the work stations while the structure is indexed to the work stations and iteratively repeating the micro pulsing indexing and working upon the structure.

Preferably, the method wherein working on the structure by at least one of the work stations prior to the structure being indexed to the plurality of work stations; and iteratively repeating the micro pulsing indexing and working upon the structure.

Preferably, the method wherein working on the structure by at least one of the work stations may occur without the structure being indexed to the work station; and iteratively repeating the micro pulsing and working upon the structure.

A portion of an aircraft assembled according to the method described above.

According to an aspect of the present disclosure, a method for fabricating a structure for an aircraft, the method comprising: micro pulsing a series of structures along a track by iteratively advancing the structures and pausing the structures; performing work on the series of structures via an array of work stations during a plurality of pauses between micro pulses; identifying a scheduled micro pulse; performing a break during the scheduled micro pulse wherein work is halted on at least one of the work stations of the array of work stations.

Advantageously, the method wherein micro pulsing comprises iteratively advancing the structures by less than a length of each structure and pausing.

Preferably, the method wherein the work comprises installing frames onto the structures.

Preferably, the method wherein micro pulsing the series of structures comprises operating powered rollers at the track.

Preferably, the method wherein micro pulsing the series of structures comprises advancing half barrel sections of fuselage along the track.

Preferably, the method further comprising performing maintenance on at least one of the work stations during the break.

Preferably, the method further comprising removing personnel from the work station during the break.

A portion of an aircraft assembled according to the method as described above.

According to an aspect of the present disclosure, a system for assembling a structure the system comprising: a track that transports structures; and an array of work stations disposed along the track that perform work on the structures according to a common takt time.

Advantageously, the system further comprising indexing units that are disposed in the array, and that comprise complementary features the complementary features being dimensioned to mate with indexing features in a manufacturing excess of the structures.

Preferably, the system wherein the takt time is equal to a length of time during which the structures are paused between micro pulses plus a length of time during which the structures are advanced between micro pulses.

Preferably, the system wherein the takt time is based upon a number of aircraft fabricated per month and the number of assemblies needed per aircraft.

Preferably, the system further comprising feeder lines that feed into the track based on the takt time.

Preferably, the system wherein the work stations perform work based upon instructions conveyed by indexing features at the structures.

According to an aspect of the present disclosure, a method for indexing a preform after each of multiple micro pulses in a process direction, the method comprising: placing a preform on a conveyance that maintains a loft of the preform; moving the preform in the process direction to a work station without changing the loft of the preform; and locking an indexing unit to one of multiple indexing features in the preform.

Advantageously, the method wherein the conveyance holds the preform in conformance with an Outer Mold Line (OML).

Preferably, the method wherein the conveyance holds the preform in conformance with an Inner Mold Line (IML).

Preferably, the method wherein conveying messages to work stations based upon at least a shape, type or location of the indexing features.

Preferably, the method wherein messages are conveyed to work stations from indexing features selected from the group consisting of: through-holes, blind holes, slots, pin, Radio Frequency Identifier (RFID) tags and/or bar codes.

Preferably, the method wherein the work stations perform work on the preform at the same time.

Preferably, the method wherein the work stations index to multiple indexing features at the same time.

A portion of an aircraft assembled according to the method as described above.

According to an aspect of the present disclosure, a method for indexing a structure after each of multiple micro pulses in a process direction, the method comprising: micro pulsing a structure being assembled from one work station to a next work station via a track; locking an indexing feature of the structure into a complementary feature at the one work station; and determining, at the moment of indexing a digitization of the structure.

Advantageously, the method wherein the track holds the structure in conformance with an Outer Mold Line (OML) loft.

Preferably, the method wherein the track holds the structure in conformance with an Inner Mold Line (IML) loft.

Preferably, the method wherein conveying messages to work station and the next work station based upon at least a shape or location of indexing features.

Preferably, the method wherein messages are conveyed to work stations from indexing features selected from the group consisting of: through-holes, blind holes, slots, pin, Radio Frequency Identifier (RFID) tags and/or bar codes.

Preferably, the method wherein the work stations perform work on the structure at the same time.

Preferably, the method wherein the work stations index to multiple indexing features at the same time.

A portion of an aircraft assembled according to the method as described above.

According to an aspect of the present disclosure, a method for assembling a structure the method comprising: advancing a structure along a track in a process direction; indexing the structure to work stations disposed along the track; and performing work on the structure via the work stations according to a takt time.

Advantageously, the method wherein the work stations perform work during a same pause between micro pulses of the structure.

Preferably, the method wherein the takt time is equal to a length of time during which the structure is paused between micro pulses plus a length of time during which the structures are advanced in a micro pulse.

Preferably, the method wherein the work stations perform work during the same micro pulse between pauses of the structure.

Preferably, the method wherein the takt time is based upon a number of aircraft fabricated per month.

Preferably, the method wherein the takt time is defined for an array of work stations performing a work assignment.

Preferably, the method wherein micro pulsing the structure along the track comprises driving the structure along a series of rollers mounted to stanchions.

Preferably, the method wherein supplying material from the feeder lines according to the takt time of a half barrel assembly line and the takt time of the feeder lines.

Preferably, the method further comprising removing scrap material from the work stations by outflow line according to the takt time of a half barrel assembly line and the takt time of the outflow line.

A portion of an aircraft assembled according to the method as described above.

According to an aspect of the present disclosure, a system for assembling structures the system comprising: a track; structures arranged along the track the structures comprising indexing features; an array of work stations disposed along the track that index to the structures and perform work on the structures according to a takt time, and that are separated from each other in a process direction by less than a length of each of the structures; and feeder lines that supply material to the work stations.

Advantageously, the system further comprising an outflow line that removes material from the work stations.

Preferably, the system wherein the work stations perform work during pauses between micro pulses of the structures.

Preferably, the system wherein the takt time is equal to a length of time during which the structures are paused between micro pulses plus a micro pulse duration.

Preferably, the system wherein the track drives the structures along a series of rollers mounted to stanchions.

Preferably, the system wherein the feeder lines supply material according to the common takt time of a half barrel assembly line and the takt time of the feeder lines.

Preferably, the system further comprising outflow line feeding chutes that remove scrap material from the work stations.

Fabricating a portion of an aircraft using the system as described above.

According to an aspect of the present disclosure, a system for assembling structures the system comprising: a track; an array of work stations disposed along the track that index to indexing features of structures arranged along the track and perform work on the structures according to takt time, and that are separated from each other in a process direction by less than a length of each of the structures; and feeder lines that supply material to the work stations.

Advantageously, the system further comprising an outflow line that removes scrap.

Preferably, the system wherein the outflow line operates according to the takt time of a half barrel assembly line and the takt time of the outflow line.

Preferably, the system wherein the work stations perform work on the structure during pauses between micro pulses.

Preferably, the system wherein the work stations perform work on the structure during micro pulses between pauses.

Preferably, the system wherein the takt time is equal to a length of time during which the structures are paused between micro pulses plus a micro pulse duration.

Preferably, the system wherein the track comprises drives the structures along a series of rollers mounted to stanchions.

Preferably, the system wherein the feeder lines supply material to the half barrel assembly line.

Preferably, the system wherein the feeder lines supply material to the work stations in a Just In Time (JIT) manner.

Preferably, the system wherein the feeder lines progress according to the takt time of the half barrel assembly line and the takt time of the feeder lines.

Preferably, the system wherein the feeder lines provide components selected from the group consisting of: frames, stringers, sections of fuselage, and door surrounds.

Preferably, the system further comprising outflow line feeds chute that remove scrap material from the work stations.

Fabricating a portion of an aircraft using the system as described above.

According to an aspect of the present disclosure, a method for assembling a structure the method comprising: advancing a structure along a track in a process direction; enforcing a predetermined shape onto the structure; and performing work on the structure via the work stations according to a takt time.

Advantageously, the method wherein the work stations perform work during the same pause between micro pulses of the structure.

Preferably, the method wherein the takt time is equal to a length of time during which the structure is paused between micro pulses plus a length of time during which the structures are advanced during the micro pulse.

Preferably, the method wherein the takt time is based upon a number of aircraft produced per month.

Preferably, the method wherein micro pulsing the structure along the track comprises driving the structure along a series of rollers mounted to stanchions.

Preferably, the method wherein supplying material from the feeder lines according to the takt time.

Preferably, the method further comprising removing scrap material from the work stations according to the takt time.

A portion of an aircraft assembled according to the method as described above.

According to an aspect of the present disclosure, a system for assembling structures the system comprising: a track; structures arranged along the track the structures comprising indexing features; an array of work stations disposed along the track that index to the structures and perform work on the structures according to a takt time, and that are separated from each other in a process direction by less than a length of each of the structures; and feeder lines that supply material to the work stations.

Advantageously, the system wherein the work stations perform work during pauses between micro pulses of the structures.

Preferably, the system wherein the takt time is equal to a length of time during which the structures are paused between micro pulses plus a micro pulse duration.

Preferably, the system wherein the track drives the structures along a series of rollers mounted to stanchions.

Preferably, the system wherein the feeder lines supply material according to the takt time.

Preferably, the system wherein the feeder lines deliver material to the work stations in a Just In Time (JIT) manner.

Preferably, the system wherein the feeder line progresses according to the takt time.

Preferably, the system wherein each feeder line progresses according to its own takt time.

Preferably, the system further comprising outflow line feeds chute that remove scrap material from the work stations.

Fabricating a portion of an aircraft using the system as described above.

According to an aspect of the present disclosure, a system for assembling structures the system comprising: a track; an array of work stations disposed along the track that index to indexing features of structures arranged along the track and perform work on the structures according to a takt time, and that are separated from each other in a process direction by less than a length of each of the structures; and feeder lines that supply material to the structures.

Advantageously, the system wherein the work stations perform work during pauses between micro pulses of the structures.

Preferably, the system wherein the work stations perform work during micro pulses between pauses of the structures.

Preferably, the system wherein the takt time is equal to a length of time during which the structures are paused between micro pulses plus a micro pulse duration.

Preferably, the system wherein the track drives the structures along a series of rollers mounted to stanchions.

Preferably, the system wherein indexing features at the structures mate with complementary features at indexing units disposed at the track.

Preferably, the system wherein the feeder lines supply material according to the takt time of the feeder lines and a half barrel assembly line.

Preferably, the system further comprising chutes that remove scrap material from the work stations.

Fabricating a portion of an aircraft using the system described above.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2 is a flowchart illustrating a method for operating a line assembly system in an illustrative embodiment.

FIG. 20 is a flowchart illustrating a method of operating a line assembly system in an illustrative embodiment.

FIG. 21 is a flowchart illustrating a further method of operating a line assembly system in an illustrative embodiment.

FIG. 22 is a flowchart illustrating a further method of operating a line assembly system in an illustrative embodiment.

FIG. 23 is a flow diagram of aircraft production and service methodology in an illustrative embodiment.

FIG. 24 is a block diagram of an aircraft in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Airframes may be made from metal, or may be implemented as composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part. Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
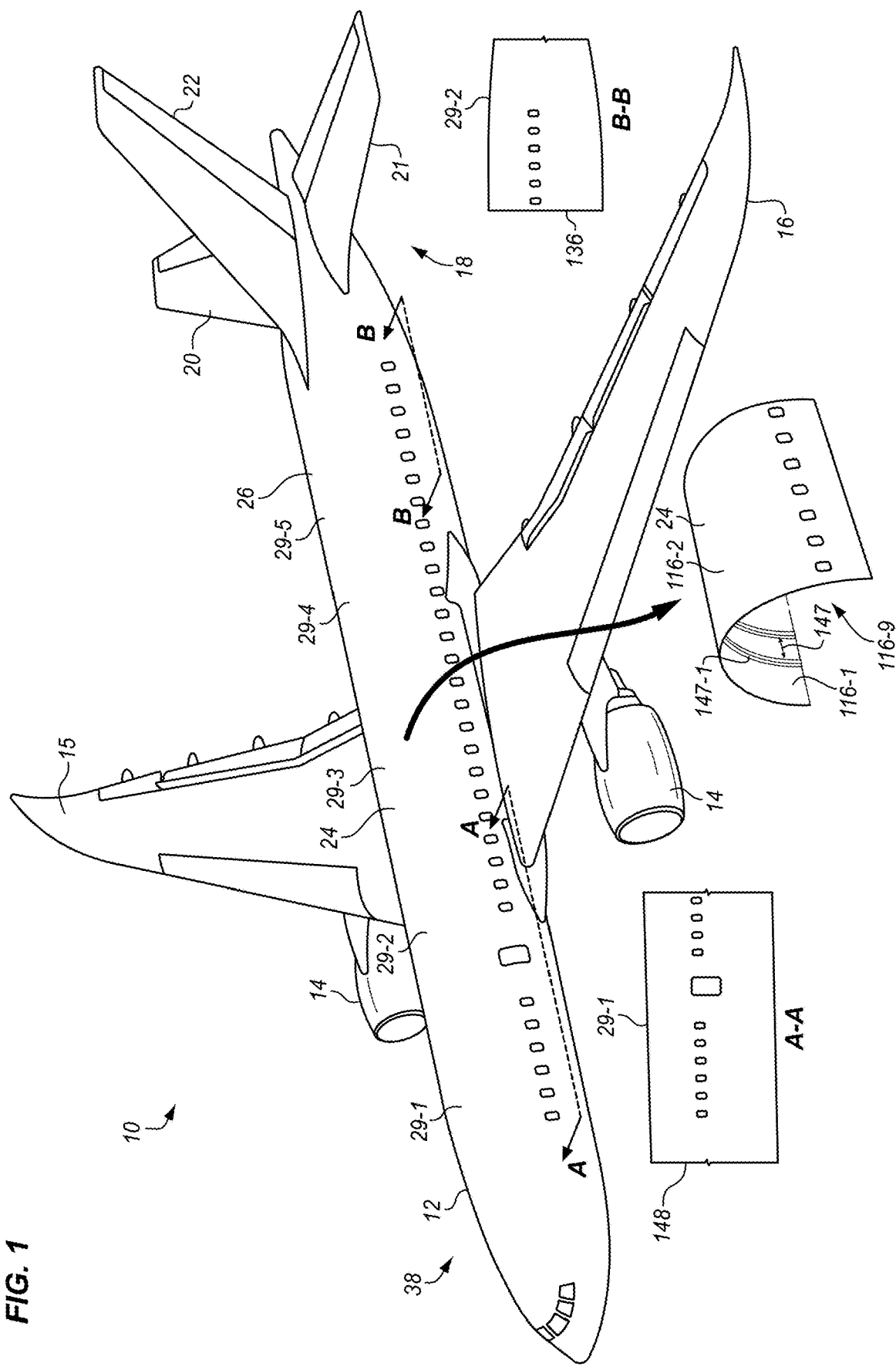
FIG. 1 depicts an assembled aircraft in an illustrative embodiment, including illustration of sections of the fuselage.

Turning now to FIG. 1, an illustration of an aircraft is depicted in which an illustrative embodiment may be implemented. Aircraft 10 is an example of an aircraft which can be formed of half barrel sections of FIG. 1A, respectively. Aircraft 10 is formed of half barrel sections 24 of fuselage 12. In this illustrative example, aircraft 10 has wing 15 and wing 16 attached to Fuselage 12. Aircraft 10 includes engine 14 attached to wing 15 and engine 14 attached to wing 16. Fuselage 12 has tail section 18 and a nose section 38. Horizontal stabilizer 20, horizontal stabilizer 21, and vertical stabilizer 22 are attached to tail section 18 of Fuselage 12. Fuselage 12 is fabricated from finalized half barrel sections 24 with an upper half barrel section 126 (FIG. 1A) joined to a lower half barrel section 128 to form a full barrel section 29-1, 29-2, 29-3, 29-4, 29-5. The full barrel section 148 corresponds to view A-A and full barrel section 136 corresponds to view B-B and are serially fastened into fuselage 12. Wing 15 and 16 are formed of wing panels 30 comprising upper wing panel 32 and a lower wing panel 34 joined together.

Figure 1A:
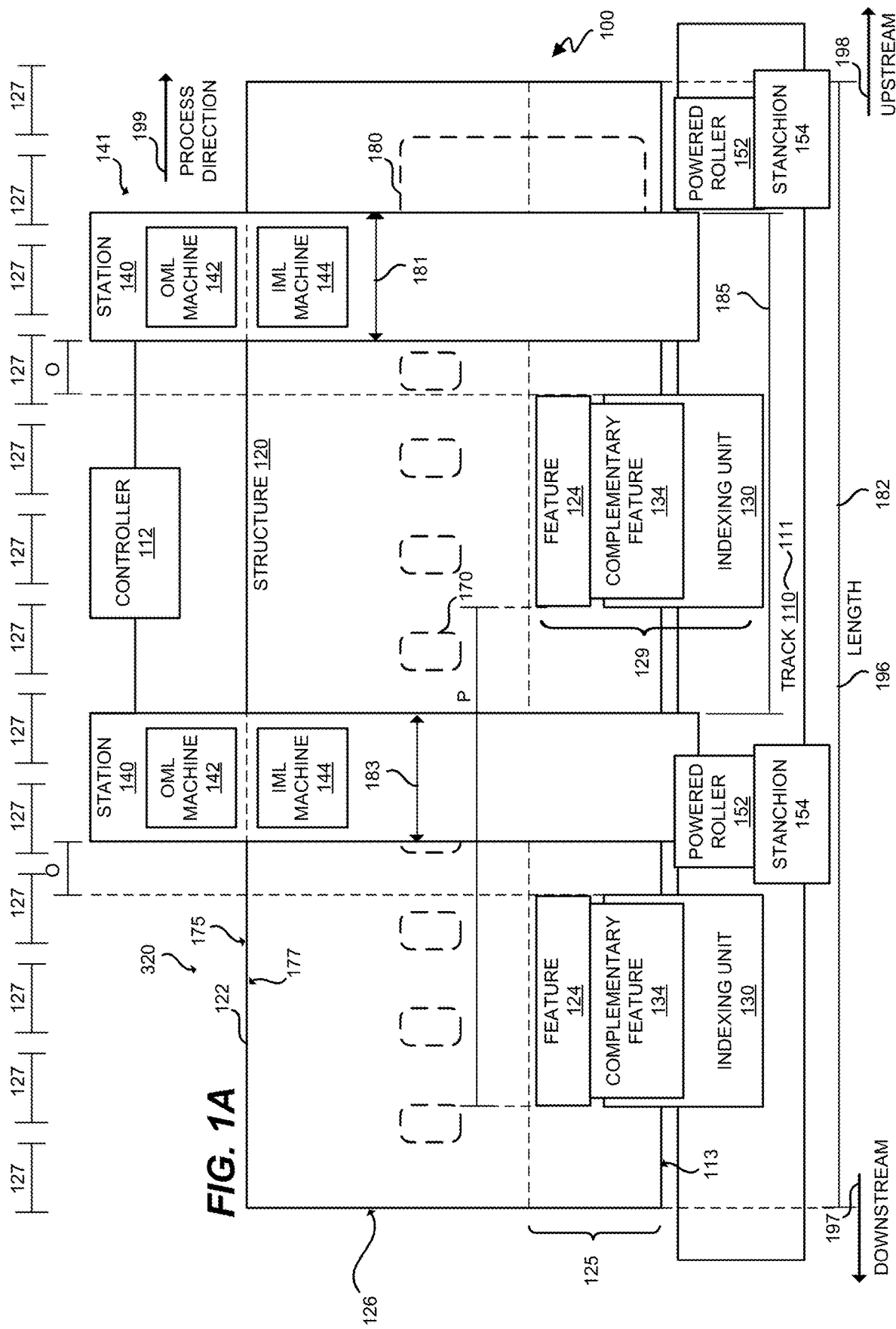
FIG. 1A is a block diagram of a line assembly system in an illustrative embodiment.

FIG. 1A is a block diagram of a line assembly system 100 in an illustrative embodiment. Line assembly system 100 comprises any system, device, or component operable to iteratively micro pulse 181 a structure 120 a distance less than its length along a track 110. Work is performed by the line assembly system 100 on the structure 120 (e.g., to modify the structure) via one or more work stations 140 at the same time while the structure 120 is paused between pulses 182, micro pulses 181, or continuously moved. The structure 120 comprises a portion of an airframe approximately forty feet long, or having any suitable length, such as a length comprising multiple frame pitches (i.e., multiple times a distance between frames at the fuselage). Structure 120 is a compilation of half barrel section 320 plus manufacturing excess 125, window manufacturing excess 170 and door manufacturing excess 180 prior to separation during assembly. In such embodiments, the sections of fuselage may comprise any suitable arcuate portion of fuselage, such as a one-third, one-quarter, one-sixth barrel section of fuselage as desired and not shown. In some embodiments, the structure 120 comprises a hardened composite part or a metal part, such as a skin panel of an aircraft awaiting installation of stringers and/or frames to enhance rigidity.

In this embodiment, line assembly system 100 comprises track 110, upon which the structure 120 is moved in a process direction 199. The track 110 comprises one or more rollers 152 mounted to the ends of stanchions 154 or pogos, and/or rails, rollers, or other elements that facilitate motion (e.g., rolling or sliding) of the structure 120 along the track 110. Rollers 152 may be powered or unpowered. In further embodiments, the track 110 includes a chain drive, motorized cart, or other powered system that is capable of moving the structure 120 in the process direction 199.

Figure 14:
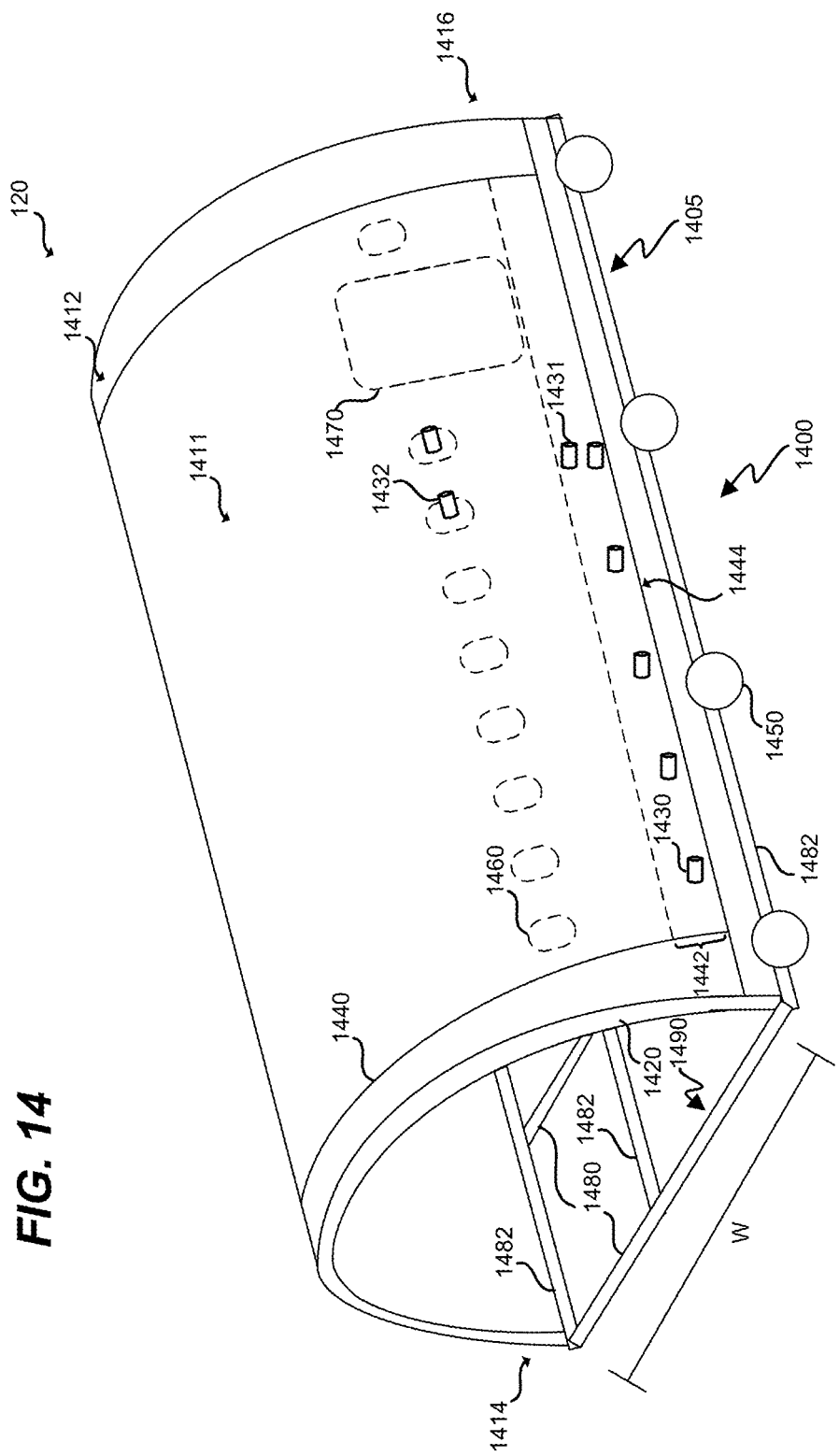
FIG. 14 is a diagram illustrating a layup mandrel for applying indexing features to a preform in an illustrative embodiment.

Line assembly system 100 further comprises indexing units 130. Each indexing unit 130 is designed to physically couple with an indexing feature 124 in a surface 122 of the structure 120. The indexing features 124 are placed at locations along the structure 120, and in one embodiment each of the indexing features 124 is separated by the same distance along the structure 120. In some embodiments, the indexing features 124 are created as part of the precure process either by lay up or by placement on or over a contour of a layup mandrel 1400 (FIG. 14). In other embodiments, the indexing features 124 are created and/or placed post-cure by manufacturing processes such as machining or drilling. In other embodiments, the indexing features 124 are created post-cure by placing Radio Frequency Identification (RFID) tags 562 and/or bar codes 564 (FIG. 5A) upon the structure 120 with a transmission able message associated with each. In still further embodiments, the indexing features 124 are located at various spacings, although the indexing features 124 are shown in a straight alignment in FIG. 1A. In further embodiments, via indexing features 124, different messages directing assembly instructions are conveyed to work stations 140 based upon a shape, type or location of an indexing feature 124 at the structure 120 (e.g., the shape, height, type or location of the indexing feature 124 relative to the structure 120). The indexing features 124 are therefore customized to provide messages including instructions on operations to be performed within the purview 183 of a work station 140, and multiple instructions can be conveyed at the same time to multiple work stations via the singular or multiple indexing features 124. The work stations 140 perform work based upon the instructions conveyed via messages from the indexing features 124 at the structures 120. The purview 183 of work stations 140 are shown in FIG. 1A with a greater length than lengthwise portions 127, but the length of the purview 183, in various embodiments, vary from frame pitch 184 to multiples or fractions thereof.

Lengthwise portions 127, in various embodiments, vary from frame pitch 184 to multiples or fractions thereof. For example, placement of an indexing feature 124 at a different vertical or lateral position of a manufacturing excess 125 contiguous with the bearing edge 113 or window manufacturing excess 170 or door manufacturing excess 180 may indicate that a different type of operation be performed. The bearing edge 113 as well as the structure 120 serves to form a portion of the tooling during the fabrication. The message can indicate an operation to be performed on the structure 120 at a particular work station. This message can be conveyed based upon the mating of the indexing feature 124 with a complementary feature 134 at the particular work station. In some embodiments, there is more than one indexing feature 124 on the structure 120 per pulse 182 or micro pulse 181 distance. Thus, one or more indexing features 124 conveying a message can engage/mate a complementary feature 134 at a particular work station per pulse 182 or micro pulse 181. Detection of the mating and transmission of the message can activate on a particular work station, for example to add a window surround, to add a particular frame arrangement, to cut out a window manufacturing excess 170 or door manufacturing excess 180, or to refrain from performing a particular operation. The mating may occur at any location for the indexing feature 124, such as in a window manufacturing excess 170 or door manufacturing excess 180. In further embodiments, the indexing features 124 are disposed in a manufacturing excess 125, window manufacturing excess 170 and/or door manufacturing excess 180, of the structure 120. The manufacturing excess 125, window manufacturing excess 170 and/or door manufacturing excess 180 are trimmed away from structure 120, such as to facilitate joining that half barrel section 320 to another half barrel section 320 and/or attached to additional components. While two work stations 140 are shown, it is contemplated that one work station or more than two work stations 140 are located along track 110.

In this embodiment, each of the indexing units 130 includes a complementary feature 134 for insertion into, grasping, or otherwise fitting or mating with a, either precure or post-cure created, indexing feature 124. In another embodiment, each of the indexing units 130 includes a complementary feature 134 to extract a message by reading the RFID tags 562 and/or bar codes 564. Indexing units 130 are placed at locations relative to an array of work stations 140 and the track 110. During assembly, structure 120 is micro pulsed a distance/pulse length (P) (e.g., a distance at least equal to the shortest distance between indexing features 124, a singular or multiple of a frame pitch 184 distance (FIG. 3), etc.), is indexed to the indexing units 130, (or distance 185 between work stations 140) and is worked upon by the work stations 140. Whenever the indexing features 124 in the structure 120 and the complementary features 134 in the indexing units 130 are mated, the location of the structure 120 is indexed to a known location in a coordinate space shared by the track 110, the indexing units 130, and the work stations 140. Furthermore, in some embodiments, indexing 129 also bears forces which are transferred through structure 120 from one side to the other, enforcing a loft in the structure 120 and causing the structure 120 to retain a desired Outer Mold Line (OML) and/or Inner Mold Line (IML). The structure 120, as pulsed or micro pulsed to a particular work station, the message characterizes the structure 120 within the purview 183 of that work station without the need for performing a characterizing scan of the structure 120 being worked upon by that work station. Using the indexing features 124 to convey a characterizing message about the structure 120 within purview 183, via the complementary features 134, to the work station 140. That is, micro pulsing does not change the structure 120 from a configuration determined prior to demold, or after scanning via Non-Destructive Inspection (NDI) techniques that are upstream 198 from the work station 140. In this manner, indexing 129 conveys to the work station 140 the configuration/characterization, including IML loft 177 and/or OML loft 175, of the portion of the structure 120 to be worked upon (within purview 183), without running a scan/rescan of the entire the structure 120 as part of each pulse 182 or micro pulse 181 in order to save time and labor while maintaining quality. Also, any forces applied to the structure 120 to bow outward or inward are resisted by the track 110 via the help of rollers mounted upon pogos, resulting in a desired Outer Mold Line (OML) and Inner Mold Line (IML) at a desired loft (e.g., an arcuate shape being retained, enabling the track 110 to enforce compliance with a desired IML loft 177 and/or OML loft 175. In further embodiments, structure 120 retains a desired IML loft 177 and/or OML loft 175 shape without the application of a shaping force and/or apparatus. In any case, the structure 120 is in conformance with a desired IML loft 177 and/or OML loft 175 when it receives work from a work station 140. Specifically, each indexing unit 130 is disposed at a known offset (0) (e.g., along three axes) from a work station 140, meaning that the act of indexing 129 the structure 120 to the indexing units 130 causes the position of the structure 120 within the purview 183 of each work station 140 to be known. The width of the track along with the IML loft 177 and/or OML loft 175 of the structure 120, and the delaying of performing cut-outs of window manufacturing excess 170 and door manufacturing excess 180 until after installation of the frames, window and door surrounds, and possibly other means of maintaining the desired IML loft 177 and/or OML loft 175, help to ensure that the structure 120 configuration is maintained as desired when indexed at a particular work station.

In one embodiment, indexing 129 is performed at least according to the following description. A structure 120 is carried upon a track 110 comprising a rail system embedded within the floor, bolted to the floor, etc. The rails (e.g., stanchions 154/pogos arranged in series) are positioned in known locations. The structure 120 has been fabricated on a layup mandrel 1400 according to precise dimensions. Furthermore, the mandrel has precise features which aid in locating the indexing features 124 in the manufacturing excess 125, window manufacturing excess 170 and/or door manufacturing excess 180 of the structure 120, and this precise layup enables indexing features 124 to be precisely located in a manufacturing excess 125, window manufacturing excess 170 and/or door manufacturing excess 180 of the structure 120. Thus, once the half barrel section 320 is located on the precisely located track 110 (and possibly an additional Inner Mold Line (IML) or Outer Mold Line (OML) forcing tooling that is disposed upstream 198 or downstream 197 of the work station 140). The 3D position and IML loft 177 and/or OML loft 175 of the half barrel section 320 is precisely known when the indexing feature 124 is engaged, without the need for a full scan via probes or optical technology at each work station 140 at each pulse 182 or micro pulse 181 or pause between pulses 182 or micro pulses 181.

In an embodiment, the inherent stiffness of the de-molded or otherwise formed structure 120 along with the precisely located track 110 can be relied upon to maintain a desired IML loft 177 and/or OML loft 175 without the need for any coupled shape defining tooling during pulsed or micro pulsed assembly. In this arrangement, the indexing features 124 are located precisely into the structure 120 relative to the IML loft 177 and/or OML loft 175 of the structure 120 and the precisely located track 110 helps convey the structure 120 from work station 140 to work station 140 without out of tolerance distortion of IML loft 177 and/or OML loft 175. Therefore, a 3D characterization/position, IML loft 177 and/or OML loft 175 and orientation and/or digitization of the structure 120 is known quickly and precisely (i.e., indexed) after each pulse 182 or micro pulse 181 without the need to re-scan the structure 120 each time.

Because of the precise indexing performed, a position of each of the tools at each work station 140 is able to be precisely determined relative to the structure 120 when it is in place at the work station 140 by an indexing unit 130. The 3D position and orientation, and/or the IML loft 177 and/or OML loft 175 of the structure 120 is then established or indexed into any Numerical Control (NC) programming or automated system in use at the work station 140. Therefore, no setup time or scanning is needed after or during each pulse 182 or micro pulse 181 of the structure 120. Furthermore, structure added to or removed from the structure 120 in the prior work station 140 may be added to whatever structure model or representation is within the system, without the need to scan the structure 120 for the changes.

In further embodiments, spacing and vertical location of indexing features 124 in a manufacturing excess 125 varies along the length of the structure 120, as does distance from a bearing edge 113 that contacts the track 110. The shape, placement, and/or size of each indexing feature 124 can vary as needed to convey a particular message to a work station 140 when mated to a complementary feature 134. For example, placement of an indexing feature 124 having a first shape in a first location can indicate that installation of a first type of frame is desired, while placement of an indexing feature 124 having a second shape in a second location can indicate that installation of a second type of frame is desired. When the indexing unit 130 is mated to a indexing feature 124 a 3D characterization of the IML loft 177 and/or OML loft 175 and/or digitization of the portion of the structure within the purview 183 of work station 140 is known, as is an operation to be performed by the work station 140. In further embodiments, the indexing features 124 are disposed in a manufacturing excess 125 of the structure 120, which is trimmed away prior to the structure 120 entering service.

In further embodiments, manufacturing excesses exist in the form of window manufacturing excess 170 and door manufacturing excess 180 which will be cut out from the structure 120 by trimming after frame installation has occurred. Frames, window surrounds and door surrounds are installed to stiffen the structure 120 prior to removing the window manufacturing excess or the door manufacturing excess. In this embodiment, each of the indexing units 130 includes a complementary feature 134 for insertion into, grasping, or otherwise fitting with an indexing feature 124. Indexing units 130 are placed at locations relative to work station 140 and track 110. During assembly, structure 120 is pulsed or micro pulsed a distance (e.g., a distance at least equal to the shortest distance between indexing features 124), indexed to the indexing units 130, and worked upon by the work station 140. That is, the structure 120 is pulsed or micro pulsed to an indexed location. Whenever the indexing features 124 in the structure 120 and the complementary features 134 in the indexing units 130 are mated, the location of the structure 120 is indexed to a known location in a coordinate space shared by the track 110, the indexing units 130, and the work station 140. Specifically, each indexing unit 130 is disposed at a known offset (O) (e.g., along three axes) from a work station 140, meaning that the act of indexing 129 a structure 120 to the indexing units 130 causes the position of the structure 120 relative to the work station 140 to be known. When the complementary features 134 are mated to the indexing features 124, a 3D characterization of the IML loft 177 and/or OML loft 175 and/or digitization of the portion of the structure 120 within the purview 183 of a work station 140, as well as which operation is to be performed by the work station 140, are known. In one embodiment, this knowledge comes from retrieving prior scans of the structure 120 (or portion thereof), and aligning the scans with position information acquired from the indexing unit 130. In a further embodiment, this knowledge is acquired by reading the RFID tags 562 coupled to the structure 120 proximate to the indexing unit 130. The indexing units 130 may also be disposed at specific indexing work stations. In this manner, different messages are conveyed to work stations 140 based upon RFID tags 562. To reiterate, the indexing 129 process conveys a digitization and/or 3D characterization of the IML loft 177 and/or OML loft 175 of the portion of the structure 120 within the purview 183 of a particular work station, as well as which operation is to be performed by the work station 140. In some embodiments, this indexing 129 conveys the message that no operation will be performed at the work station 140 for this portion of the structure 120. Multiple work stations can be indexed and instructed at the same time prior to work being performed upon the structure 120 at the same time.

Work stations 140 perform work on the structure 120. The work stations 140 are disposed along the track 110 and are separated by less than the length of the structure 120. This work may comprise installing new parts, like frames, to the structure 120 via fasteners, removing material (e.g., drilling or trimming), adding material, etc. In one embodiment, each of the work stations 140 performs a type of work such as installing frames, installing intercostals, installing door surrounds, installing window surrounds, trimming off door manufacturing excess 180, trimming off manufacturing excess 125, or cutting window manufacturing excess 170.

In embodiments where the structure 120 comprises a half barrel section 320 of aircraft fuselage, some of the work stations 140 comprise a pair of rings (e.g., fixed arches), one which the structure 120 travels through/under during a pulse 182, or micro pulse 181. In other embodiments, the structure 120 travels over the work station 140 or an inner portion of work station 140 during a pulse 182, or micro pulse 181, particularly work stations located entirely within structure 120 during a pulse 182, or micro pulse 181. This exposes both the Outer Mold Line (OML) and the Inner Mold Line (IML) of the structure 120 to the work stations 140, which facilitates clamp-up for fastener installation and other tasks. An OML machine 142 and an IML machine 144 clamp together in order to perform fastener installation when installing a frame into the structure 120. In further embodiments, a physical fit formed between the indexing units 130 and the structure 120 causes the structure 120 to resist applied forces as discussed above. That is, forces applied to the structure 120 are resisted, at least in part, by the physical fit/coupling between the structure 120 and the indexing units 130, and are transferred to the indexing units 130. This enables the work stations 140 to perform One-Up Assembly (OUA) processes. OUA includes assembly with a machining operation such as drilling, and then without disassembly to clean up drill filings, deburr and to install sealant on faying surfaces prior to fastener install after reassembly. OUA processes apply sealant in place at faying surfaces, and fastening is performed without disassembly for deburr and drill shaving clean up between the structures being fastened together. This enables a desired level of clamping force between the structure 120 and the machine as the machine performs work. In further embodiments, work stations 140 may perform operations such as Non-Destructive Imaging (NDI), window and door cut-outs, edge trimming operations, edge sealing and other tasks.

The operations of the work stations 140 are managed by controller 112. In one embodiment, controller 112 determines a progress of the structure 120 along the track 110 (e.g., based on input from a technician), and uses this input to manage the operations of the work stations 140 in accordance with instructions stored in a Numerical Control (NC) program and any messages conveyed via indexing 129. Controller 112 may be implemented, for example, as custom circuitry, as a hardware processor executing programmed instructions, or some combination thereof.

Phrased another way, FIG. 1A depicts an apparatus for assembling structures, that includes at least one work station disposed along a track 110, and indexing units 130 that are disposed relative to the at least one work station. The indexing units 130 are disposed at known offsets from corresponding ones of the at least one work station. Furthermore, the indexing units 130 include complementary features 134 that couple with indexing features 124 at structures 120 that receive work from the work stations 140. In some embodiments the complementary features 134 are dimensioned to mate with the indexing features 124 in a manufacturing excess 125, window manufacturing excess 170 and/or door manufacturing excess 180 of the structures 120. In further embodiments, the at least one work station comprises multiple work stations, and the multiple work stations are arrayed serially along a track 110 and the structure 120 that progresses along the track 110.

Figure 1B:
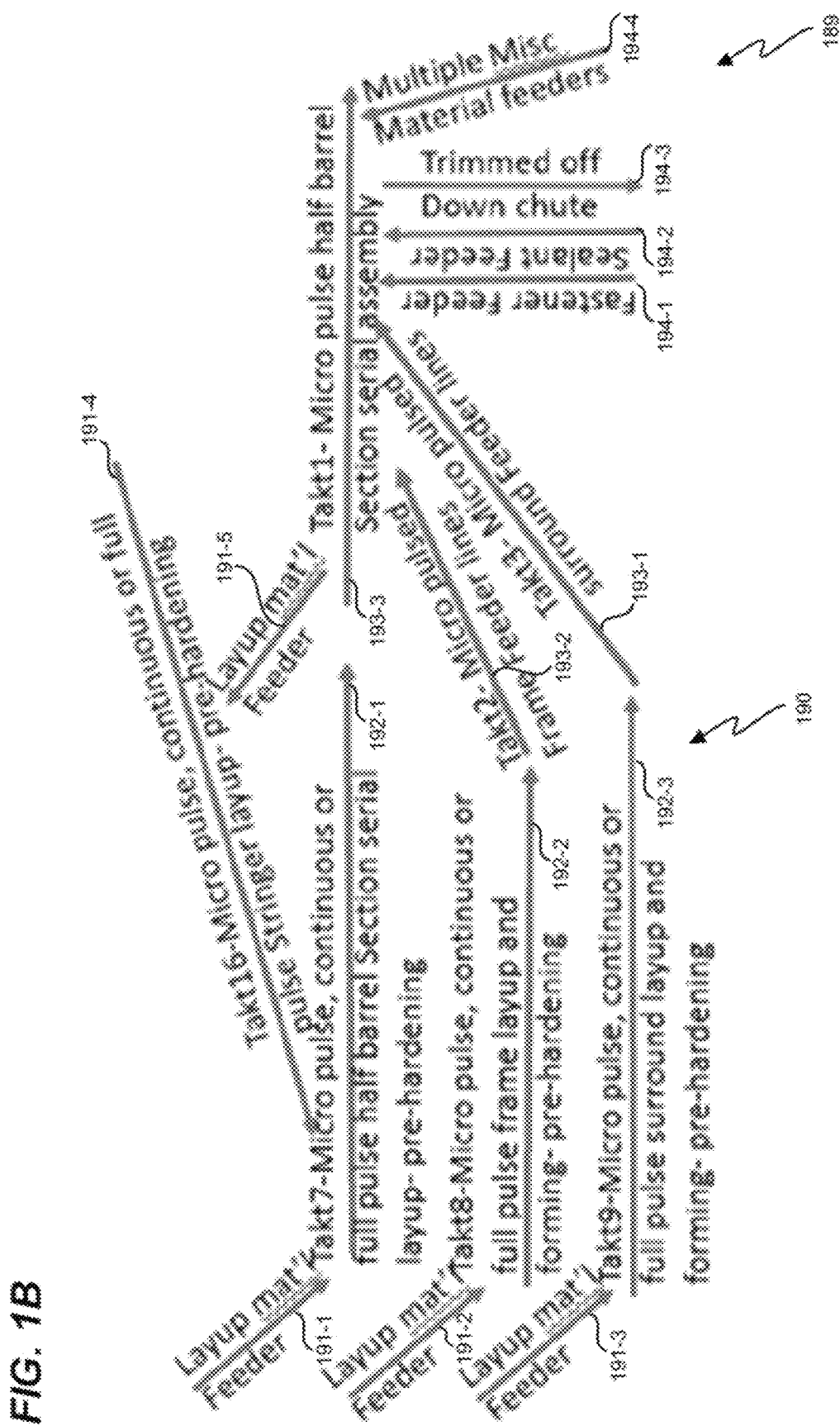
FIG. 1B is a diagram of assembly lines of a fabrication environment in an illustrative embodiment.

FIG. 1B is a diagram 190 of assembly lines of a fabrication environment in an illustrative embodiment. In this embodiment, feeder lines 191-1 through 191-3 provide raw materials for layup lines, and may feed into a track (e.g., track 110) based on a takt time. Specifically, feeder line 191-1 provides layup material (e.g., CFRP tows, broad goods material, etc.) for a structure 120 and serial layup line 192-1, feeder line 191-2 provides layup material for a frame layup and forming line 192-2, and feeder line 191-3 provides material to surround layup and forming line 192-3. Half barrel section 320 serial layup line 192-1 lays up structure 120 preforms for hardening into composite parts such as structure 120, and receives stringer preforms from feeder line 191-4. Feeder line 191-4 fabricates the stringer preforms via any suitable means, and receives layup material from feeder line 191-5. Frame layup and forming line 192-2 fabricates preforms for frames, and supplies these preforms to frame feeder line 193-2. Surround layup and forming line 192-3 fabricates preforms for surrounds (e.g., window surrounds, door surrounds, etc.) that will be placed onto structure 120 of fuselage.

Preforms for structure 120 of fuselage provided to half barrel assembly line 193-3. Half barrel assembly line 193-3 also receives frames via frame feeder line 193-2, and receives surrounds via surround feeder lines 193-1. Half barrel assembly line 193-3 further hardens one or more of these components together receives fasteners via fastener feeder line 194-1 and sealant via sealant feeder line 194-2 to facilitate installing hardened parts (e.g., hardened frames), and removes trimmed off material, scrap, and/or debris via outflow line 194-3 that operates according to a common or distinct takt time. Additional miscellaneous material feeder lines 194-4 provide various components that facilitate further fabrication of the structure 120 being fabricated. Furthermore, the various lines discussed above may be operated to continuously advance the components that they work on, may micro pulse 181 the components by iteratively advancing the components by less than their length and pausing, or may pulse 182 the components by iteratively advancing the components by a length and pausing between each advancement.

Each of the various lines depicted in FIG. 1B may operate at the same or different takt times from other lines, in order to provide just-in-time delivery of components as needed. For example, the various numbered takts listed in FIG. 1B may be set to a common interval (e.g., twenty minutes), or to different intervals. The many lines each utilize a unique or shared takt, and provide Just In Time (JIT) delivery to the next line. In one embodiment, the feeder lines have a takt different from the takt of the line that they feed. Each feeder line can have a unique takt or can have similar takts to other feeder lines the lines that they feed.

FIG. 1B is a diagram 190 of assembly lines 189 of a fabrication environment in an illustrative embodiment. In this embodiment, feeder lines 191-1 through 191-3 provide raw materials for layup lines. Specifically, feeder line 191-1 provides layup material (e.g., CFRP tows, broad goods material, etc.) for a half-barrel section and serial layup line 192-1, feeder line 191-2 provides layup material for a frame layup and forming line 192-2, and feeder line 191-3 provides material to surround layup and forming line 192-3. Serial layup line 192-1 lays up half-barrel section preforms for hardening into composite parts, and receives stringer preforms from feeder line 191-4. Feeder line 191-4 fabricates the stringer preforms via any suitable means, and receives layup material from feeder line 191-5. Frame layup and forming line 192-2 fabricates preforms for frames, and supplies these preforms to frame feeder line 193-2. Surround layup and forming line 192-3 fabricates preforms for surrounds (e.g., window surrounds, door surrounds, etc.) that will be placed onto a section of fuselage.

Preforms for sections of fuselage provided to half barrel assembly line 193-3. Half barrel assembly line 193-3 also receives frames via frame feeder line 193-2, and receives surrounds via surround feeder lines 193-1. Half barrel assembly line 193-3 further fastens one or more of these components together receives fasteners via fastener feeder line 194-1 and sealant via sealant feeder line 194-2 to facilitate installing parts (e.g., frames), and removes trimmed off material, such as manufacturing excess 125, window manufacturing excess 170 or door manufacturing excess 180 via outflow line 194-3. Scrap material is removed from the work stations 140 by outflow line 194-3 according to the takt time of a half barrel assembly line 193-3 and the takt time of the outflow line 194-3. Additional miscellaneous material feeder lines 194-4 provide various components that facilitate further fabrication of the half barrel sections being fabricated. Material is supplying from the feeder lines (191-1, 191-2, 191-3, 193-1, 193-2, 194-1, 194-2, 194-4) according to the takt time of a half barrel assembly line (193-3) and the takt time of the feeder lines (191-1, 191-2, 191-3, 193-1, 193-2, 194-1, 194-2, 194-4). Furthermore, the various lines discussed above may be operated to continuously advance the components that they work on, may "micro pulse" the components by iteratively advancing the components by less than their length and pausing, or may "full pulse" the components by iteratively advancing the components by at least their length and pausing.

The arrangement of feeder lines depicted in FIG. 1B illustrates how subcomponents may be fabricated and brought together to form larger components, in a manner wherein the subcomponents are delivered JIT to a next phase of assembly. The takts of the various feeder lines are designed/tailored based on the takts of other feeder lines to make this possible. For example, a takt of a feeder line for a subcomponent (e.g., a wing) may be a fraction of a takt for a feeder line for a component (e.g., an entire airframe). Stated in another manner, the takt for a component may be equal to an integer multiple of a takt for a subcomponent which is utilized multiple times within the component. In one embodiment, a takt time is based upon a number of aircraft fabricated per month. In one embodiment, a takt time is based upon a number of aircraft fabricated per month and the number of assemblies needed per aircraft. In a further embodiment, a takt time is defined for an array of work stations 140 performing a work assignment (e.g., a scheduled amount of work that is repeated across multiple components).

Illustrative details of the operation of line assembly system 100 will be discussed with regard to FIG. 2. Assume, for this embodiment, that one or more of the structures 120 have been placed in sequence onto the track 110, and are ready to be assembled via the fastening of additional components.

FIG. 2 is a flowchart illustrating a method 200 for operating a line assembly system 100 in an illustrative embodiment. The steps of method 200 are described with reference to line assembly system 100 of FIG. 1, but those skilled in the art will appreciate that method 200 may be performed in other. The steps of the flowcharts described herein are not all inclusive and may include other steps not shown. The steps described herein may also be performed in an alternative order.

In step 202, structure 120 is micro pulsed or pulsed along the track 110 in a process direction 199 (e.g., along the length of the track 110) by less than a length of the structure 120, or by the length of the structure 120, respectively. This occurs at a common work station takt time, which is to say that all work stations 140 can perform work during the same period of time (e.g., during the same pause between micro pulses 181 or pulses 182 or during micro pulses 181). That is, multiple work stations can perform work on the same or different structures during the same pause between micro pulses 181 or pulses 182, or during the same micro pulse or pulse between pauses. Alternatively, working on the structure 120 by at least one of the work stations 140 prior to the structure 120 being indexed to the work stations 140. In addition, performing work on the structure by at least one of the work stations 140 may occur without the structure 120 being indexed to the work station 140, such as during NDI inspection.

Micro pulsing the structure 120 exposes the next lengthwise portion of the structure 120 for receiving work by the work stations 140 brought within the purview 183 of work station 140. In an embodiment, lengthwise portions 127 are equal to micro pulse 181 or a multiple of micro pulses 181 or a fraction of micro pulse 181. While micro pulse 181 is shown equal to purview 183, other lengths, such as frame pitch 184, are contemplated. In embodiments where the track 110 is powered, this comprises driving one or more elements (e.g., powered and unpowered rollers) of the track 110 to move the structure in the process direction 199. In the example depicted in FIG. 1A, rollers 152 are used for this purpose. The rollers 152 are mounted to stanchions 154 that are mounted to a factory floor, and are driven synchronously to micro pulse 181 the structure or continually advance it in a process direction 199. In further embodiments, this comprises operating an Autonomous Guided Vehicle (AGV), operating a powered cart mounted to the track 110, or operating another component in order to micro pulse 181 the structure 120 to a desired location along the track 110. In embodiments where more than one structure are disposed on the track 110, the structures 120 are also micro pulsed by less than the length of the structure 120, in synchronization with the micro pulsing of the structure 120 depicted in FIG. 1A. The structures 120 are worked upon via multiple work stations disposed serially along the process direction 199 during the same pauses, and occupy portions of the track 110 that are immediately upstream 198 or downstream 197 separated by gap 1990 (FIG. 19) other ones of the structures 120.

In step 204, index the structure to a work station 140 located along the track 110 by mating indexing features 124 in a manufacturing excess 125 of the structure 120 to complementary features 134 that are placed relative to the track 110 at known offsets from work stations 140 at the track 110. The structure 120 is indexed to the track 110 and/or a work station 140 by mating the indexing features 124 in the structure 120 to complementary features 134 that are placed relative to the track 110 at known offsets from work stations 140 at the track 110. This enables a position of a work station 140 to be known relative to a portion of the structure 120 that receives work from the work station 140. In one embodiment, engaging complementary features, such as inserting pins disposed at the track 110, and/or a work station 140 into indexing features 124 such as holes that have been placed into the structure 120, such as by machining, at predefined intervals. After the structure 120 has been indexed, the location of the structure 120 relative to the work stations 140 is known (i.e., at least in part because the offsets from the indexing units 130 to the work stations 140 are known). Hence, work can be performed at a desired level of accuracy (e.g., to within fractions of an inch) even for very large structures. In embodiments where multiple structures 120 travel along the track 110 at once, the indexing 129 of the structures 120 may be performed in synchronization, such that a plurality of the indexing features 124 of each of the structures 120 are mated synchronously with a plurality of work stations 140. In one embodiment, indexing 129 of a structure 120 to work stations 140 is performed such that multiple work stations are indexed to the structure 120 at once, and the multiple work stations perform work during a pause between micro pulses 181 of the structure 120.

In step 206, the work stations 140 work on the structure 120 while the structure 120 is indexed to the track 110 and/or work stations 140. The work may comprise any of the operations discussed above with regard to the work stations 140. In one embodiment, the work comprises installing frames by fastening the frames to the structure 120. In embodiments where multiple structures 120 travel along the track 110 at once, performing work on the structures 120 is performed in synchronization. That is, indexing 129 is synchronized across work stations 140 and the work stations 140 perform work on different lengthwise portions 127 of the structure 120 during pauses between micro pulses 181.

In step 208, steps 202-206 (i.e., the micro pulsing, indexing, and working) are repeated until the structure 120 has moved a distance at least equal to its length. That is, the structure 120 continues to move in small increments and receive work from the work stations 140 (e.g., from multiple work stations at once that each perform work on a different lengthwise portion 127 of the structure at a common takt time during pauses between micro pulses 181 of the structure 120), until the structure 120 has proceeded through all of the work stations 140. Proceeding by these incremental steps, the structure 120 eventually proceeds for a longer distance than its length depending on the number and type of operations to be performed on the structure 120. Furthermore, the structure 120 may be routed via switching techniques to another track 110 having different combinations of work stations 140 in order to receive additional or alternative types of work.

Method 200 provides a technical benefit over prior techniques, because it enables line-based assembly techniques to be implemented upon large structures such as aircraft fuselages. That is, multiple lengthwise portions 127 of a structure 120 are worked upon simultaneously by multiple work stations arranged in series at a common takt. Because this technique moves the large structures in small increments less than a length of the structure 120, micro pulses 181, it also reduces the amount of work that needs to be completed in each interval of work, which reduces both the risk of a delay and the potential length of such a delay. The amount of work can be divided more evenly amongst the micro pulsed through work stations 140. Micro-pulsing for all work stations 140 at the track 110 is performed at a common takt for each of the plurality of micro pulses 181. The amount of work performed by each work station 140 is sized to permit completion of the work at each work station 140 during pauses between micro pulses 181. The amount of work is adjusted in a particular work station if the takt cannot be met. For example, another work station 140 may be added to perform some of the work load of the work station 140 that cannot complete its tasks within the takt time. Use of a second work station provides twice as much time to perform the same amount of work.

Figure 3:
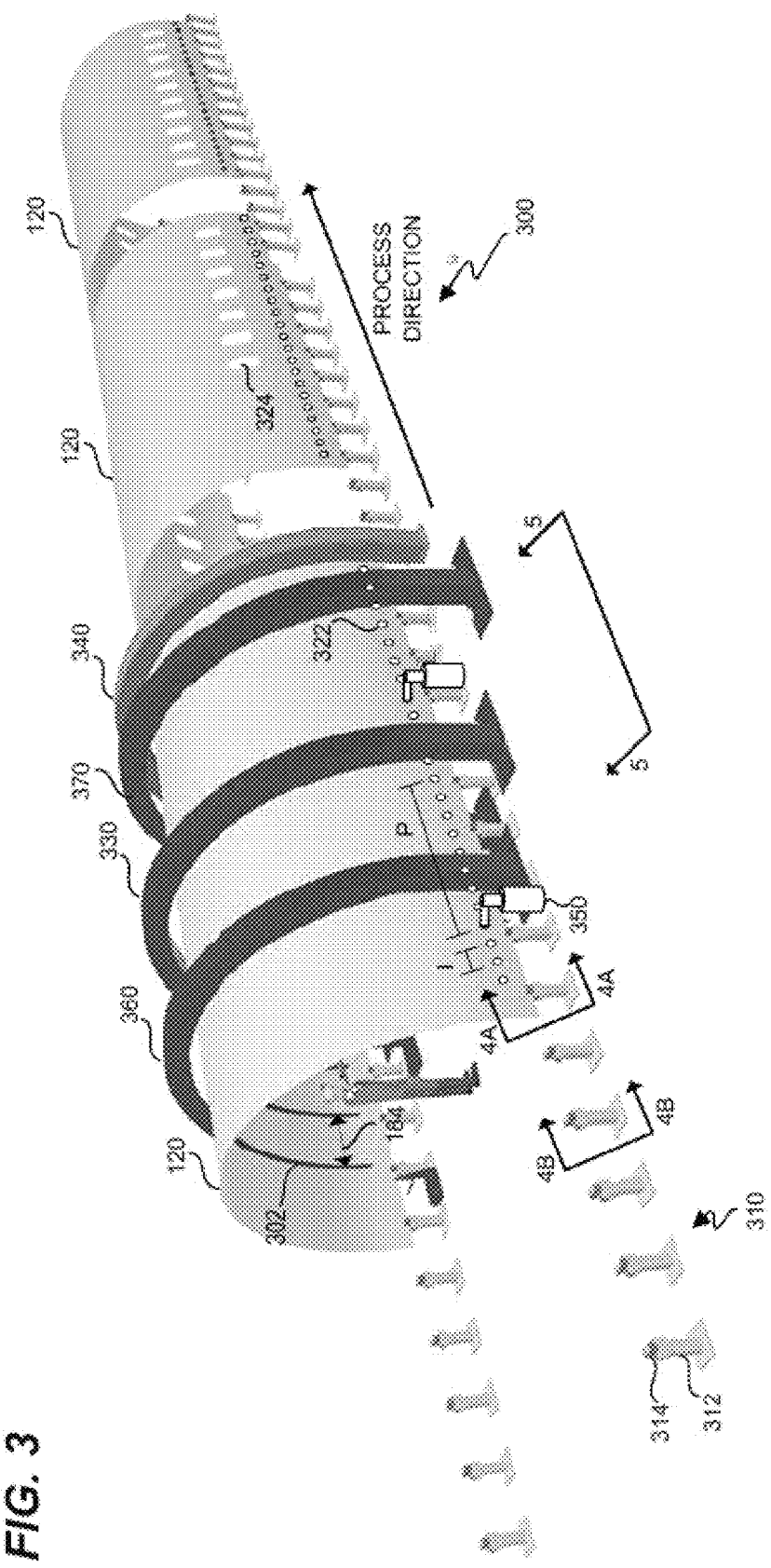
FIG. 3 is a perspective view of a line assembly system that installs frames onto half-barrel fuselage sections in an illustrative embodiment.

FIG. 3 is a perspective view of a line assembly system 300 that installs frames amongst other assembly operations onto one or more of structures 120 in an illustrative embodiment. Line assembly system 300 corresponds to line assembly system 100. As shown in FIG. 3, line assembly system 300 includes work stations 330 and work stations 340, which perform work by fastening frames 302 into place and/or cutting out window openings, respectively, as well as work station 360 and work station 370, which perform NDI inspection processes and window surround installation, respectively. Work station 330 and work station 340 as well as work station 360 and work station 370 correspond to work stations 140. In between sessions of work, the structure 120 move along a track 310 which has been discretized into a series of posts 312 (also referred to as stanchions or pogos) that include rollers 314 for receiving the structure 120. Track 310 correspond to track 110. During each pulse, the structure 120 is moved by a distance P. The distance P may comprise a frame pitch 184 of less than 24 inches or a multiple thereof, which may be a frame pitch 184 distance between frames on the assembled fuselage. Furthermore, a Non-Destructive Imaging (NDI) inspection work station may be followed by multiple frame install work stations and window and door surround install work stations, and further followed by window and door cut out work stations 140, a final panel trim work station 140, and/or any other number of work stations 140. The work stations 140 are arranged to fit within and/or around a length of the structure 120 that is pulsing through the work station 140 during assembly. Indexing features 322, which correspond to indexing features 124, within the structure 120 are separated by an interval I, which is less than P or a multiple of P. At the end of each micro pulse 181, the indexing features 322 are mated to an indexing unit 350 at the work stations 140 during pauses between the micro pulses 181. The indexing 129 is therefore synchronized at the work stations 140. Some work stations 140 (such as those that perform NDI) perform work during the micro pulse 181, while others (such as frame install work stations 140) perform work during pauses between micro pulses 181. FIG. 3 further depicts cut-outs 324 for windows.

In one embodiment, each of the work stations 140 is separated from its neighbors by a distance equal to a frame pitch (or some multiple or fraction thereof). For example, a Non-Destructive Inspection (NDI) station may be separated from a first frame installation work station by a distance of frame pitch 184, and the frame installation work station may be one of a series of frame installation work stations that are each separated from others by frame pitch 184. The last frame installation work station may be followed by one or more window surround install work station(s), and then one or more door surround install work station(s), one or more cut-out work station(s), one or more edge trim work station(s), one or more edge seal work station(s), etc. in series. Each work station 140 being separated by one frame pitch (or some multiple or fraction thereof) from its neighbors. In embodiments where structure 120 run forty or more feet line, and frame pitch 184 is eighteen to twenty-two inches, such an arrangement beneficially yields a technical benefit by saving space on the factory floor. Rather than having one cell the length of structure 120 performing one operation at a time, the work density is dramatically increased if various work assignments are performed in one space of the same size. That is, the work is performed by work stations 140 arranged serially along the current foot print of at least one structure, instead of being defined as multiple stationary cells that are each sized to contain the entire length of the structure 120.

Figure 4A:
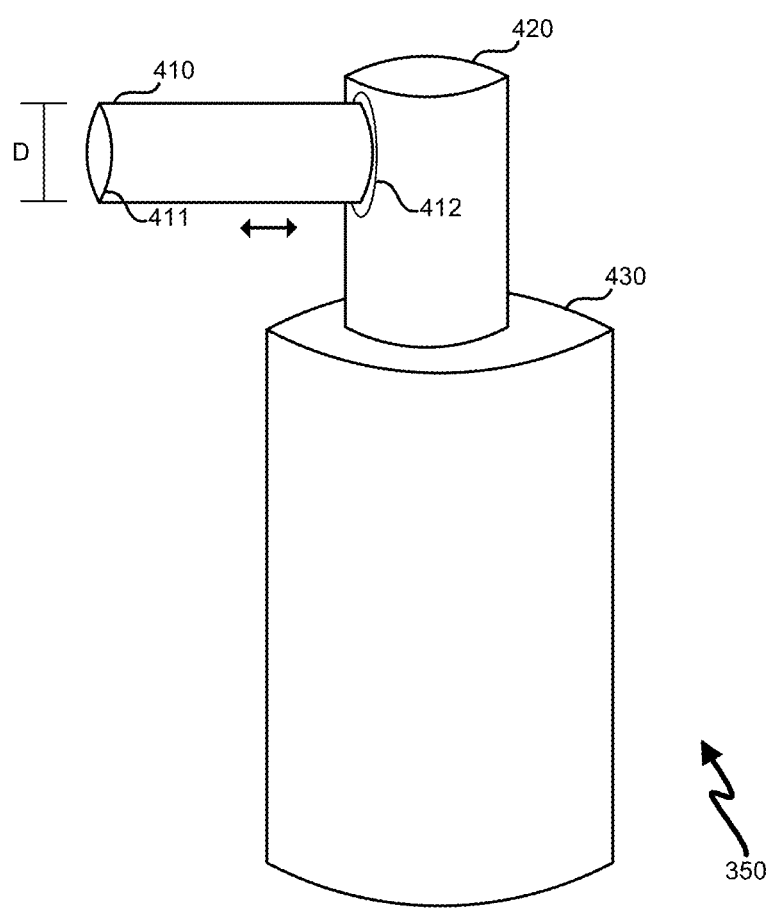
FIG. 4A is a perspective view of an indexing unit of a line assembly system in an illustrative embodiment.

FIG. 4A is a perspective view of an indexing unit 130 of a line assembly system 300 in an illustrative embodiment, and corresponds with view arrows 4A of FIG. 3. According to FIG. 4A, the indexing unit 350 includes a pin 410 having a cylindrical shape and a diameter D for insertion into indexing feature 124 on the structure 120, and the pin 410 is capable of swiveling along joint 420 and/or retracting into a recess 412 in order to move into and out of alignment with indexing features 124. Indexing unit 350 also includes a body 430 having a cylindrical shape 411, which is positioned with respect to a track 110. However, in further embodiments a variety of indexing units 130 and indexing features 124 can be utilized as desired.

Figure 4B:
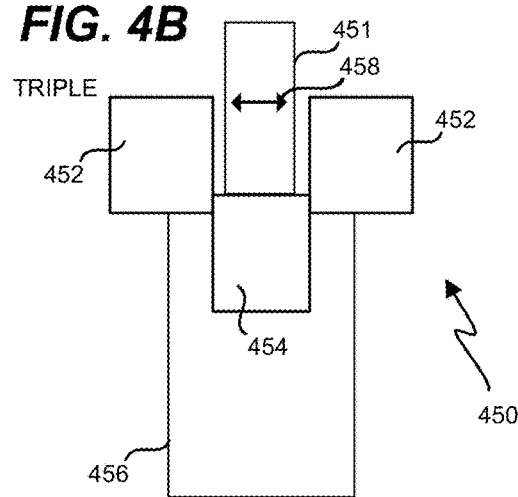
FIGS. 4B-4D are front views of stanchions that include rollers for a line assembly system in an illustrative embodiment.
Figure 4C:
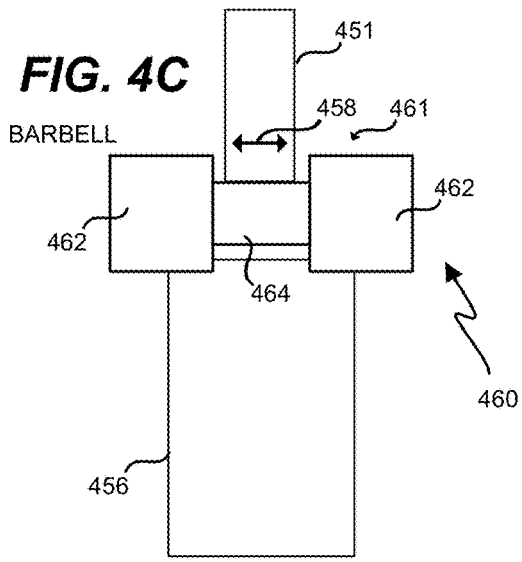
Figure 4D:
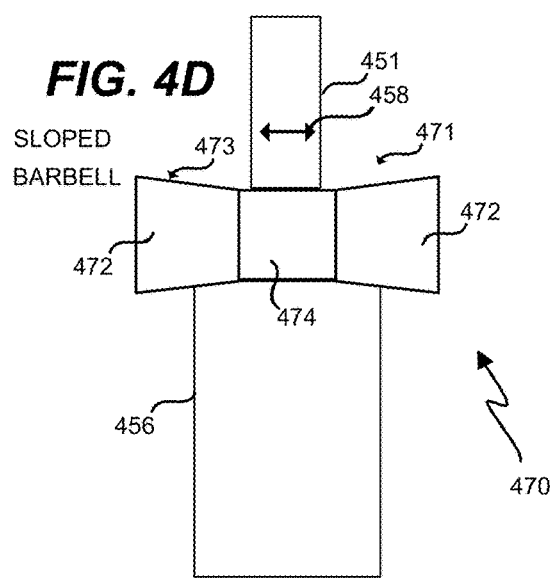

FIGS. 4B-4D are front views of stanchions 456 that include rollers 452 for a line assembly system 300 in an illustrative embodiment. These FIGS. correspond with view arrows 4B of FIG. 3. In some embodiments, the stanchions are extendable, while in others, they are fixed. In FIG. 4B a system 450 including three rollers 452, 454 is utilized to bear a bearing edge 451 (e.g., a lower edge) of a structure 120. Rollers 452 roll freely, and prevent lateral displacement 458 of the bearing edge 451. Bearing edge 451 corresponds to bearing edge 113. Meanwhile, roller 454 is powered, and drives the bearing edge 451 in a process direction 199 into or out of the page. In a further embodiment, rollers 452 are powered while roller 454 rolls freely. In FIG. 4C a system 460 including one "barbell" roller 461 is utilized to bear a bearing edge 451 (e.g., a lower edge) of a structure. Roller 461 is powered, and includes bells 462, which prevent lateral displacement 458 of the bearing edge 451. Meanwhile, central shaft 464 carries the bearing edge 451. In FIG. 4D a system 470 including one "sloped barbell" roller 471 is utilized to bear a bearing edge 451 (e.g., a lower edge) of a structure. Roller 471 is powered, and includes bells 472, which include sloped surfaces 473 that prevent lateral displacement 458 of the bearing edge 451. Meanwhile, central shaft 474 carries the bearing edge 451. The rollers and the bells described above in relation to FIGS. 4B-4D are independently operated, and may move independently or even be independently powered, even though they act synchronously to drive structure in a process direction.

Figure 5A:
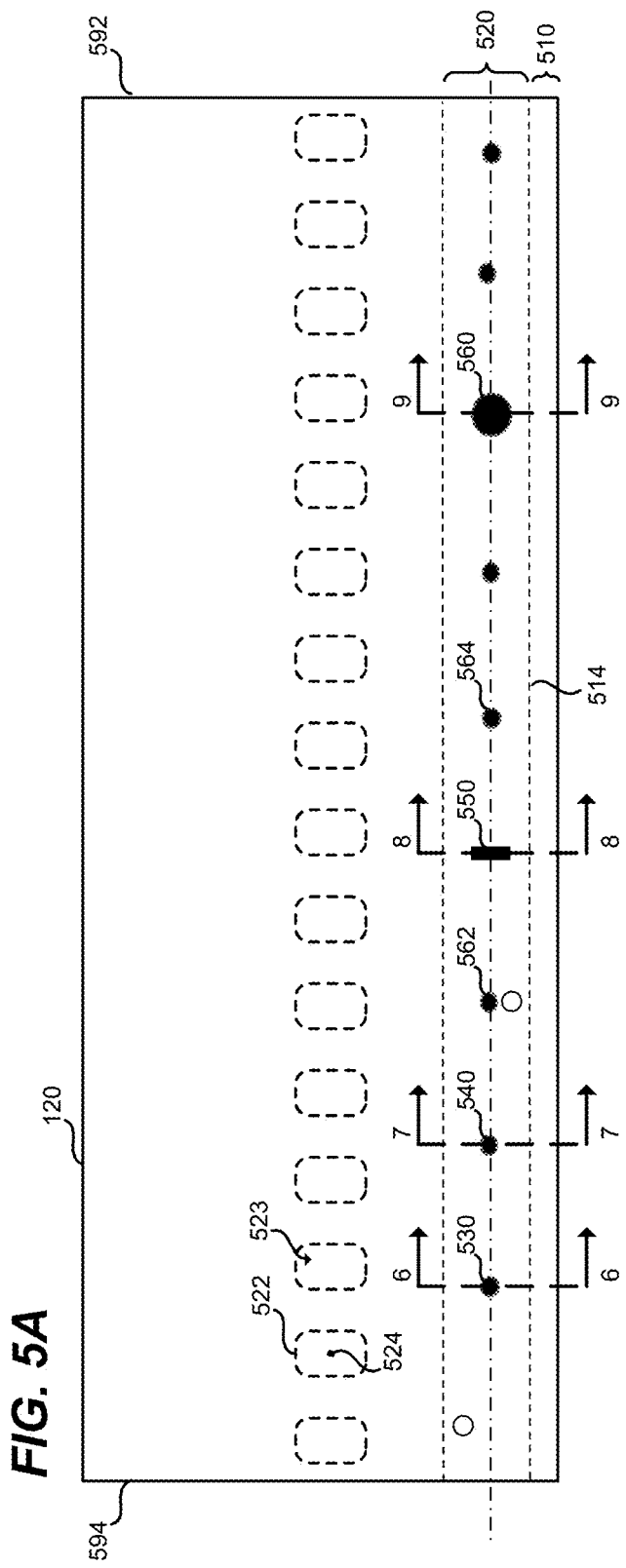
FIG. 5A is a side view of features machined into a section of fuselage in an illustrative embodiment.

FIG. 5A is a side view of indexing features 322 in a structure 120 (or other structure) in an illustrative embodiment, and corresponds with view arrows 5 of FIG. 3. Any one or combination of these indexing features 322 (e.g., through-hole 530, blind hole 540, slot 550, pin 560, RFID tags 562 and/or bar codes 564, etc.) may be implemented at a given structure in the form of structure 120. In this embodiment, the structure 120 remains integral with a flash edge portion 510 as well as a manufacturing excess 520, corresponds to manufacturing excess 125, along a bearing edge 512, corresponding to bearing edge 113, (also known as a "lower edge") of the structure 120. The structure 120 further includes a window manufacturing excess 522, which corresponds to window manufacturing excess 170 disposed at regions 523 of material that will be cut out from the structure 120 after a window cut-out work station (e.g., one of work stations 140 of FIG. 1). Indexing features 322 (e.g., through-hole 530, blind hole 540, slot 550, pin 560, RFID tags 562 and/or bar codes 564, etc.) are placed in the manufacturing excess 520 and/or the window manufacturing excess 522, and these indexing features 322 (e.g., through-hole 530, blind hole 540, slot 550, pin 560, RFID tags 562 and/or bar codes 564, etc.) may be installed during the post cure process, prior to demolding. Also, the flash edge portion 510 is roughly trimmed off to establish a bearing edge 512 for the structure 120. The flash edge portion 510 is trimmed off to form a bearing edge 514 before moving the structure 120 along a track (e.g., track 110 of FIG. 1), in order to eliminate any sharp edges formed during the curing process. The bearing edge 514 is used to transport the structure 120 over the rollers. Eventually, when the manufacturing excess 520 and/or window manufacturing excess 522 is no longer needed for indexing 129, the manufacturing excess 520 is trimmed off. This provides an advantage, because any bumps or nicks added to the bearing edge 514 during pulsing can be trimmed off with the manufacturing excess 520 and/or window manufacturing excess 522 without the need for rework. In one embodiment, less precise rework is required if the trimming is performed on a portion of the structure that is not integrated into a completed aircraft (i.e., if the portion of the structure is not a "flyaway" component of an aircraft that is made integral with the aircraft). Such rework can be limited to what is needed to micro pulse the structure 120 through work stations 140 while providing a desired accuracy/precision for fabrication work.

In further embodiments, the two arcuate edges 592 and 594 of the structure 120 may also have a rough manufacturing edge that is trimmed on a layup mandrel 1400 and optionally finally trimmed near the end of micro pulsed fabrication. This provides a similar benefit in that resulting bumps or nicks can be trimmed off prior to final assembly. That is, the bumps or nicks are trimmed off as part of trimming to achieve a desired fly away edge dimension.

Figure 9:
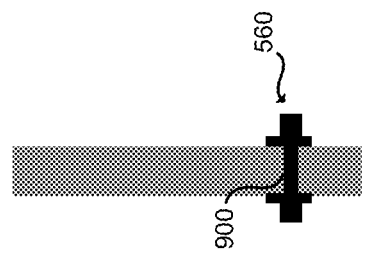
FIGS. 6-10 are cut-through front views of features in a section of fuselage in an illustrative embodiment.
Figure 8:
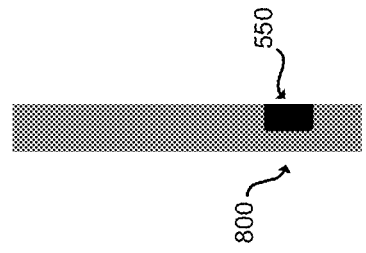
Figure 7:
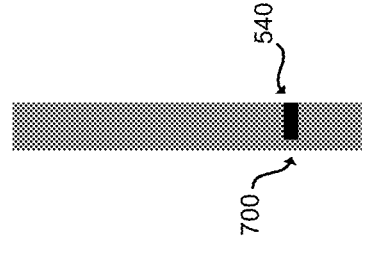
Figure 6:
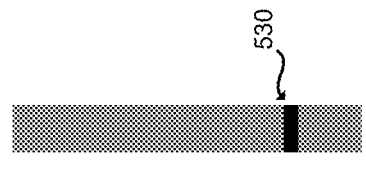

As shown in FIG. 5A, the indexing features 124 are installed in the manufacturing excess 520 and/or are installed as indexing features 524 at window manufacturing excess 522 and correspond to indexing features 124 and manufacturing excess 125, respectively. The manufacturing excesses 125, 170, 180 are trimmed/removed, for example just before the half barrel section 320 is fastened to another half barrel section 320 (e.g., to form a full barrel section when two half barrel sections are longitudinally joined together), or during a window cut-out operation. The indexing features 524 include a through-hole 530, a blind hole 540 which terminates at backing 700 of FIG. 7, a slot 550 which terminates at a backing 800 of FIG. 8, and a pin 560 that is driven through a through-hole 900 of FIG. 9. Thus, the features may comprise holes of varying kinds, countersinks, notches, or even pins. In FIG. 9, the pin itself is the mating feature that an indexing station or other work station 140 would engage with, while in other FIGS., a hole or notch is engaged with a work station 140.

Each of these different features may therefore be utilized to facilitate indexing 129 or other operations at various work stations. For example, some work stations 140 may use one type of feature (e.g., blind holes that facilitate placement of a structure relative to the station), while other work stations 140 may use another type of feature (e.g., pins that facilitate gripping of the part). The potential to use male features (e.g., pins) and/or female features (e.g., holes) means that low-profile stations (e.g., NDI inspection stations) can interact with female features of a part without encountering physical interference, These are all examples of some of the many geometries that could be implemented in order to achieve indexing fits in desired fashions.

The spacing of indexing features 524 provided herein is not shown to scale, and it is possible that micro pulses 181 could be set to a frame pitch 184 or other distance. Thus, the spacing can be much less than is currently shown, and may be less than the spacing between windows. In a further embodiment, there is more than one feature on the structure 120 per pulse. An indexing feature 124 can engage/mate a complementary feature 134 at a particular work station per micro pulse 181. The mating turns on a particular work station to add a particular frame arrangement at a particular location, or a window surround or trim off window manufacturing excess 522, or trim off manufacturing excess 520, or door manufacturing excess 180, or indicates that a work station 140 shall not perform a particular operation within purview 183.

Figure 5B:
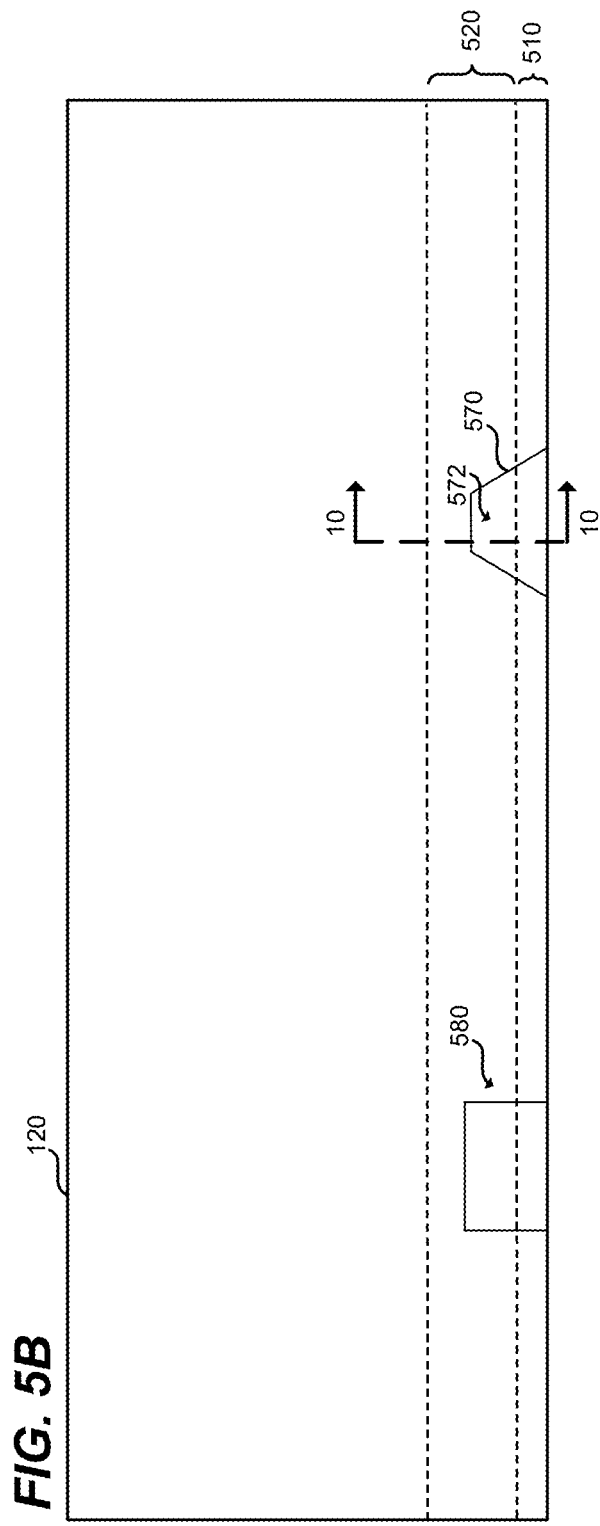
FIG. 5B is a side view of a notch in a section of fuselage in an illustrative embodiment.
Figure 10:

FIG. 5B is a side view of a notch 570 in a structure 120 of fuselage in an illustrative embodiment, and corresponds with view arrows 5 of FIG. 3. Notch 570 is trapezoidal, includes a recess 572. While the notch 570 does not continue wholly through the thickness T of the manufacturing excess 520 (as shown in FIG. 10) in this embodiment. In further embodiments, a through notch or a notch accessed from one side only and not shown is possible. A further notch in the form of a square notch 580 is also shown in FIG. 5B. Additional shapes and/or dimensions of notches may facilitate locking/alignment/placement at different stations that perform work. For example, a window cut-out station may utilize a square notch 580, while a frame installation station may utilize notch 570, where notch 570 is trapezoidal shaped.

Figure 11:
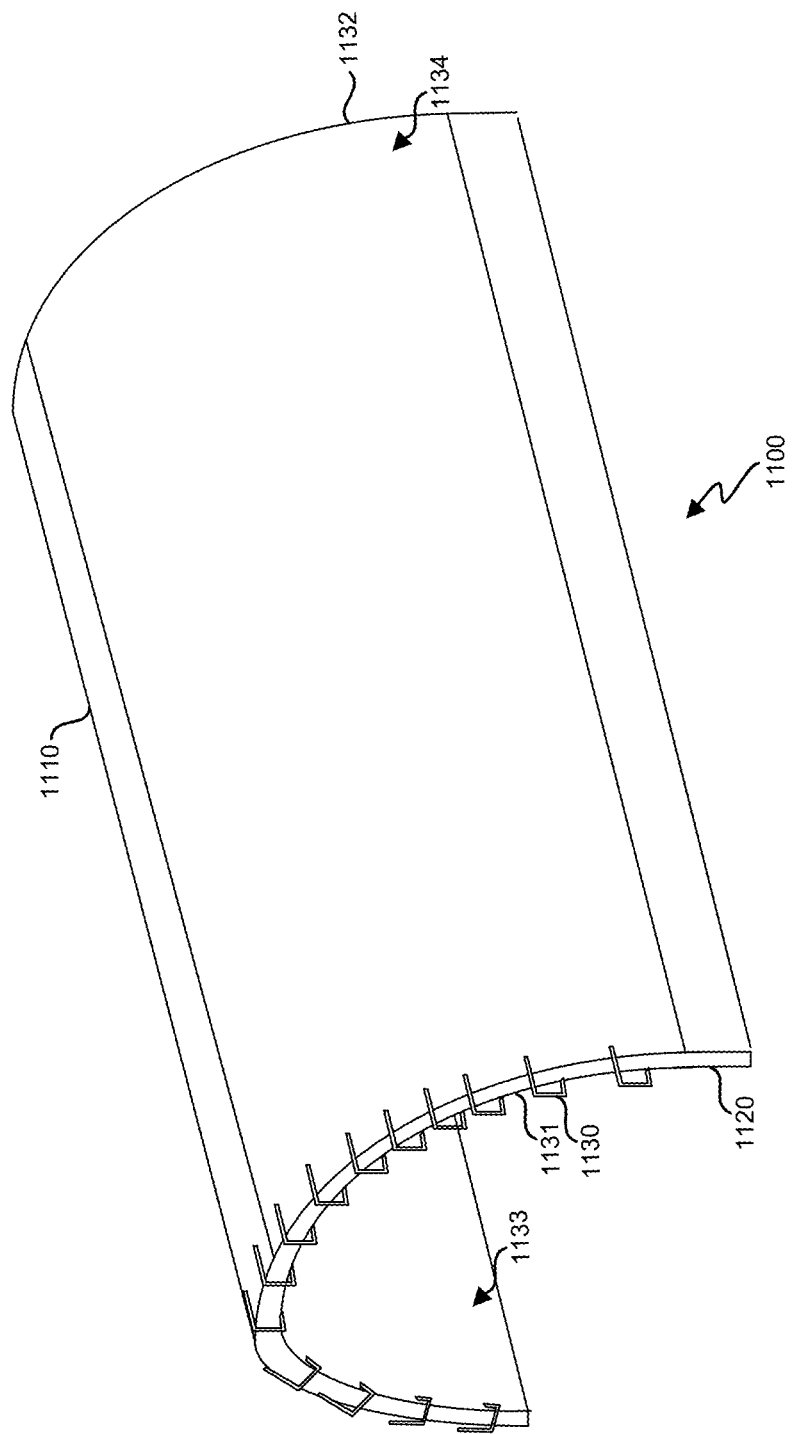
FIG. 11 is a perspective view of a contour enforcement system that maintains a contour of a half-barrel section of an aircraft in an illustrative embodiment

FIG. 11 is a perspective view of a contour enforcement system 1100 that maintains the contour of a half barrel fuselage section 1110 of an aircraft in an illustrative embodiment for an embodiment prior to the installation of frames and/or window and door surrounds. Contour enforcement system 1100 is particularly beneficial for enforcing an IML loft 177 and/or OML loft 175 onto a skin of a half barrel fuselage section 1110, before and after frames have been installed into the half barrel fuselage section 1110. Half barrel fuselage section 1110 corresponds to structure 120. According to FIG. 11, contour enforcement system 1100 includes a structural ring 1120—located on either the leading edge 1132 or trailing edge 1131 or both of a half barrel fuselage section 1110. In FIG. 11, contour enforcement system 1100 illustrates a structural ring 1120 located only on leading edge 1132. The structural ring can be affixed to the Inner Mold Line (IML) surface 1133, or the Outer Mold Line (OML) surface 1134 or complementarily coupled to the leading edge 1132 or trailing edge 1131 and/or to overlap both the Inner Mold Line (IML) surface 1133, or the Outer Mold Line (OML) surface 1134. The ring may be attached via clamps or fasteners, and is removed after the half barrel fuselage section 1110 is placed on a track (e.g., micro-pulsed or pulsed along track 110), prior to installation of frames and/or wind or door surrounds that provide mechanical support. After frames and/or wind or door surrounds or other stiffeners are installed, the half barrel fuselage section 1110 is stiffened enough to make the contour enforcement system 1100 unnecessary. Another embodiment does not use the contour enforcement system 1100 prior to installing frames and/or wind or door surrounds or other stiffeners.

Contour enforcement system 1100 forms a semicircular shape, and further includes multiple clamps 1130 which affix the structural ring 1120 to a half barrel fuselage section 1110, in order to enforce the desired level of curvature. In some embodiments, various enforcement systems are utilized to ensure compliance with desired IML loft 177 and/or OML loft 175 desired positioning along six degrees of freedom, etc. In further embodiments, the desired enforcement parameters vary between work stations 140, or multiple work stations share a single enforcement mechanism. Enforcement systems may even contact and/or interact with indexing features 124 to provide the desired amount and type of enforcement. Furthermore, compliance with a desired level of loft or contour enforcement may be detected by NDI inspection stations or other components.

Figure 12:
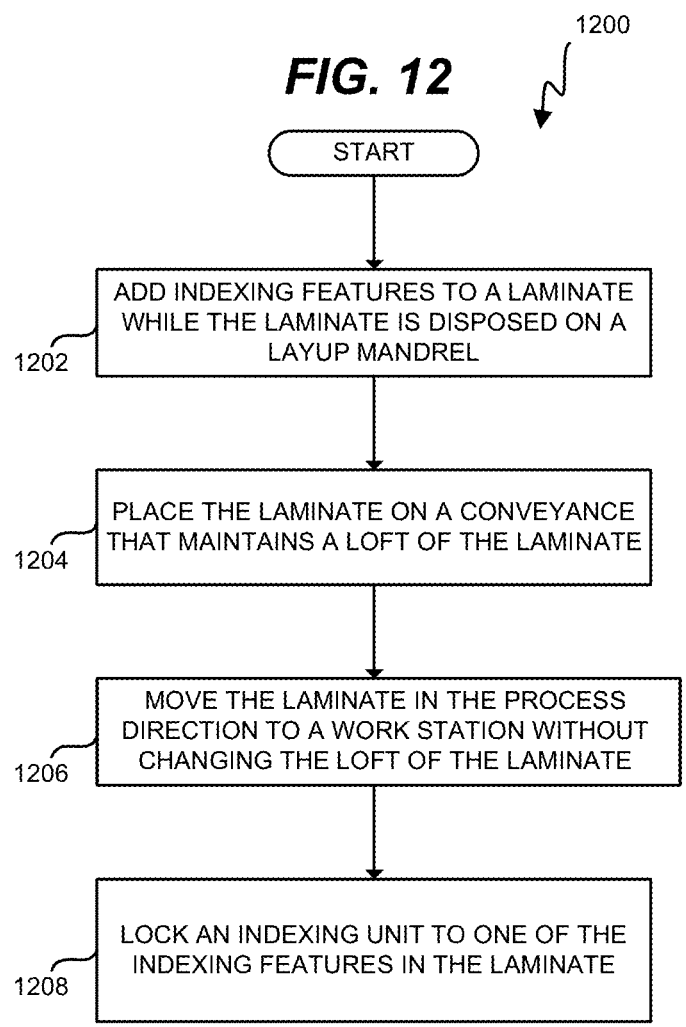
FIG. 12-13 are flowcharts illustrating further methods for operating a line assembly system in an illustrative embodiment.
Figure 13:
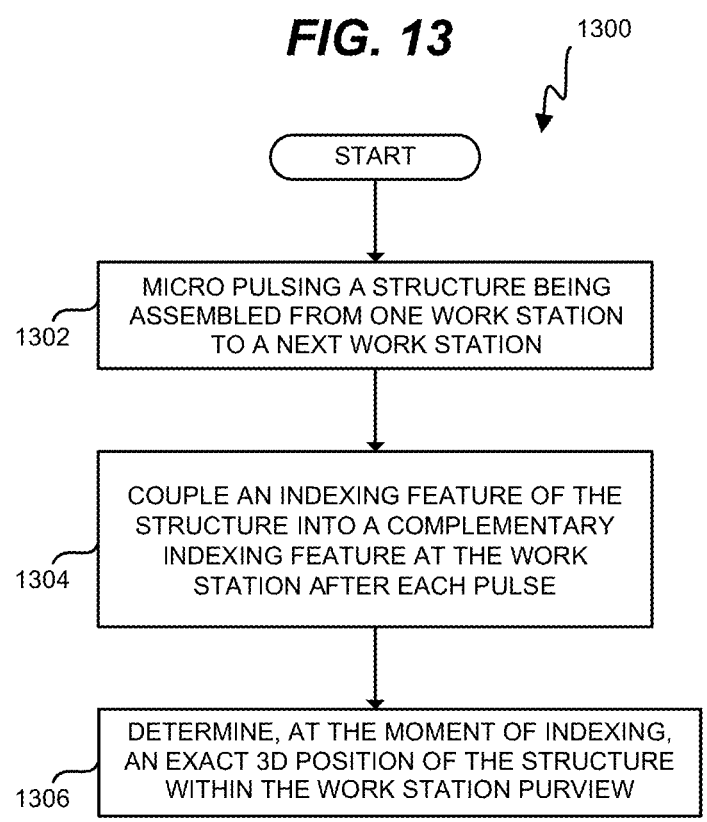

FIG. 12-13 are flowcharts illustrating further methods for operating a line assembly system 100 in an illustrative embodiment. FIG. 12 illustrates a method 1200 for indexing 129 a structure 120 after each of multiple micro pulses in a process direction 199. Method 1200 includes adding indexing features 124 to a preform 1440 (FIG. 14) (e.g., a green or pre-hardened structure) while the preform 1440 is disposed on a layup mandrel (e.g., layup mandrel 1400 of FIG. 14) in step 1202. Placing the hardened preform 1440 on a conveyance 111 (e.g. track 110) that maintains a loft and/or contour of the preform 1440 in step 1204. Then moving the preform 1440 in the process direction to a work station 140 without changing the loft of the preform 1440 in step 1206. Method 1200 further includes coupling an indexing unit 130 to one of the indexing features 124 in the preform 1440 in step 1208. In one embodiment, this step involves coupling more than one indexing unit 130 to respective indexing features so that multiple work stations can work upon a structure 120 within its purview 183 during a pause between micro pulses 181.

FIG. 13 illustrates a method 1300 for indexing 129 a structure 120 after each of multiple micro pulses in a process direction 199. Specifically, method 1300 pertains to micro pulsing a structure 120 by less than its length. Step 1302 includes micro pulsing a structure 120 being assembled from one work station to a next of the work stations 140. Step 1304 includes locking an indexing feature 124 of the structure 120 into complementary feature 134 at the work station 140 (e.g., at an indexing unit 130 disposed at the work station 140). Step 1306 comprises determining, at the moment of indexing 129, an exact 3D position of the structure 120. As used herein, an exact 3D position may refer to determining the position of a part at least twenty feet long relative to each work station 140 within a desired tolerance along each of three perpendicular axes and/or conveys a configuration/characterization, including IML loft 177 and/or OML loft 175 of a structure 120 within a purview 183 of a work station 140. The exact 3D position of the structure 120 is known because the exact position of the indexing feature 124 relative to the structure 120 is known, and because the structure 120 has already been characterized upstream 198 via an NDI scan, via optical techniques or other means such as reliance upon the accuracy of layup mandrel being conveyed into the hardened structure 120. In a further embodiment, a 3D IML loft 177 and/or OML loft 175 characterization of a structure 120 is known without scanning, based upon the accuracy of a layup mandrel that was used to form the structure 120. Shape defining features such as wheels and arches may also be utilized to enforce a contour and/or IML loft 177 and/or OML loft 175, obviating the need for scanning.

The characterization of a portion of the structure 120 within purview 183 of work station 140 is linked to an indexing feature 124 placed into or on the manufacturing excess 125 of the structure 120. When the indexing feature 124 is mated to the complementary feature 134, the characterization of the portion of the structure 120 to be worked upon by the work station 140 is communicated to the work station 140. Similar operations are performed simultaneously at all of the work stations 140 relative to the respective portions of the structure 120 to be worked upon.

FIG. 14 is a diagram illustrating a layup mandrel 1400 for applying indexing features to a preform in an illustrative embodiment.

According to FIG. 14, layup mandrel 1400 includes a structure 120 having a contoured surface 1412 for receiving a preform 1440. The preform 1440 is conformed against the contoured surface 1412, which defines a shape for the preform 1440. The contoured surface 1412 also includes surface features 1430 disposed at predefined locations. Some of these surface features 1430 may comprise holes, protrusions, indents, etc. that will be covered by the preform 1440 (although others may have the preform laid-up around them), such that shaping of the preform 1440 at the contoured surface 1412 of the layup mandrel 1400 applies indexing features 1431 (corresponding to indexing feature 124) to the preform 1440 that are dimensioned for indexing 129 a resulting composite part 1411, which corresponds to structure 120, to work stations 140 disposed along a track 110 traveled by the composite part 1411 during fabrication. Surface features 1430 may be disposed on/near either longitudinal edge 1405 of the layup mandrel 1400, such that on a resulting composite part 1411, indexing features 1431 (resulting from surface features 1430 at predefined locations) are separated by a width W of the layup mandrel 1400 and are found at a manufacturing excess 1442 of the resulting composite part 1411 near each of the longitudinal edges 1405. The manufacturing excess 1442 may define a less precise edge (e.g., a more irregular edge) than the edge that results after a final trimming operation. That is, after hardening, the composite part 1411 includes a manufacturing excess 1442 than can have rough layup crenulations forming a flash edge portion 510. The manufacturing excess 1442 is then trimmed prior to demolding to exhibit a bearing edge 1444. After fabrication and final trimming, a final cut edge that will be used when joined to the other structure 120 is created The manufacturing excess 1442 operates as a tooling/transporting surface/edge during transport over a track 110 (e.g., along powered rollers mounted to stanchions in a track 110 comprising a series of stanchions). This arrangement enables efficient and rapid transport of materials in a just-in-time fashion to work stations 140, by passing materials under the stanchions. The manufacturing excess 1442 that exist after such transport processes are trimmed off during final trim. The bearing edge is already within tolerance as it is trimmed prior to demolding and is part of the structure 120. The layup mandrel 1400 works as a tooling surface during preform 1440 formation and a post hardening fixture during indexing feature 1431 installation and flash edge portion 510 separation. The window manufacturing excess 1460 and door manufacturing excess 1470 are removed by a downstream 197 work station 140 while still on track 110 and then the final trim process removes the manufacturing excess 1442 to bring the structure 120 edge to a final desired characteristic prior to joining the half barrel section 320 to another half barrel section 320 to bring together an upper and a lower to form a full barrel section. Thus, no special tooling is needed to be added to the half barrel edges to facilitate transport via roller. The manufacturing excess 1442 is therefore used as an expendable tooling surface in the form of a transport element via bearing edge 1444, which corresponds to bearing edge 113. In such embodiments, a bearing edge 1444 in the manufacturing excess 1442 is cut to within a first tolerance, which is less than the tolerance used for the final separation of the manufacturing excess 1442 from the half barrel section 320 as part of longitudinal joining of the half barrel sections. The trimming to a first tolerance forms a bearing edge 1444 at the desired location and with a desired straightness so that the structure 120 is within desired tolerance as it moves by micro pulse 181 through work stations 140 line, until the structure 120 is fully fabricated, and finally trimmed to form an edge for joining to another half barrel section 320. An NDI scanning station disposed prior to demold or as a work station 140 as part of the micro pulse 181 processing determines a configuration of the structure 120 during pauses between micro pulses 181. The NDI scanning can be performed on the entirety of the half barrel section 320 during the pauses between micro pulses 181 and/or during micro pulses 181, or can be implemented as a series of scans of only a portion or the entirety of the half barrel section prior to or after demold. After each micro pulse 181, the 3D characterization of structure 120 is assumed to be as-scanned, and the indexing 129 engagement conveys the digitization and/or 3D characterization to the particular work station interfacing with that segment of the structure 120 within the purview 183 of the particular work station. If structure 120 is added or subtracted in upstream 198 work stations 140, a theoretical version of those changes is incorporated into the digitization and/or 3D characterization conveyed in downstream 197 indexing 129.

FIG. 14 further illustrates that layup mandrel 1400 has an arcuate shape 1420, and the contoured surface 1412 defines a shape for an arcuate section of fuselage for an aircraft. The layup mandrel 1400 further comprises braces 1480 and 1482, which are part of a cart 1490 beneath the layup mandrel 1400 that supports the layup mandrel 1400 from its lower surface. Wheels 1450 convey the cart 1490, and hence the layup mandrel 1400, in a process direction 199. In further embodiments, the cart 1490 is made integral with the layup mandrel 1400, or is implemented as an AGV. However, in further embodiments the layup mandrel 1400 does not utilize a separate cart, but rather has mobility built into it. FIG. 14 further depicts window manufacturing excess 1460 and door manufacturing excess 1470 in which indexing features 1431 may be installed into the preform 1440.

In further embodiments, the surface features 1430 comprise holes drilled into the layup mandrel 1400, and the indexing features 1431 applied to the preform 1440 comprise notches that cover or surround the holes. In still further embodiments, the surface features 1430 comprise protrusions from the layup mandrel 1400, and the indexing features 1431 applied to the preform 1440 comprise notches that cover the protrusions. In further embodiments, features include recesses in the layup mandrel 1400 filled with potting compound to create an expendable layup surface to permit drill through or trimming on the mandrel post hardening, without drilling or cutting directly into the portions of the layup mandrel 1400 contoured surface 1412 that are not potted. That is, an over drill or over cut can be made into the potting compound. The potting compound may then be resurfaced to restore the layup surface prior to the next use of the layup mandrel 1400. The potting compound facilitates use of a smooth layup surface at possible trim or drill locations. The surface features 1430 are located on each side of the structure 120, and are located within manufacturing excess 1442 on each of the left side 1414 and right side 1416. However, the surface features 1430 need not be identical or mirrored versions of each other from the left side 1414 to the right side 1416. While surface features 1430 are illustrated as cylindrical, other shapes are possible.

While most of the surface features 1430 are shown in a straight line arrangement, it is possible that the surface features 1430 can have varying spacing from the bearing edge 1444 (as shown by surface features 1430) or varying locations within a window manufacturing excess 1460 or door manufacturing excess 1470 (as shown by surface features 1432). The type and location of the surface features 1430, 1432 can convey a different message for a particular work station for a particular operation. A work station 140 performing a particular operation can have a mating feature if the operation is to be performed at the particular work station. For instance, a work station 140 for installing a window will mate up to a surface feature 1430, 1432 where a window is intended, but not up to a feature when no window installation is needed. In some embodiments, this concept is broken down to a particular surface feature for a particular frame installation as every frame install work station 140 can install various frames. A portion of the structure 120 can have a surface feature for mating at a frame install station and another for mating at a window surround installation station and another at a window cut out station and another at an edge trim station. All of this occurs simultaneously for a plurality of work stations 140 based upon a matching plurality of indexing features 1431.

Figure 15:
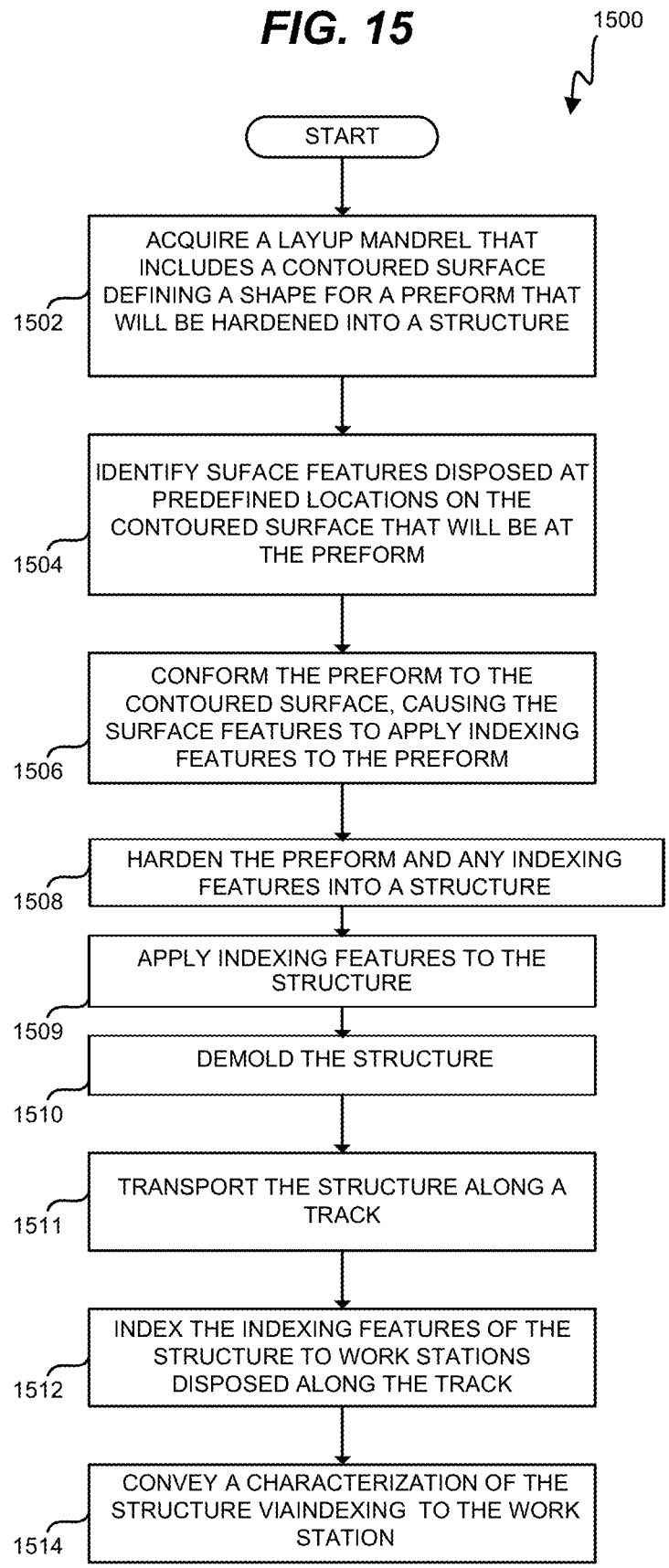
FIG. 15 is a flowchart illustrating a method for applying indexing features to a preform in an illustrative embodiment.

FIG. 15 is a flowchart illustrating a method 1500 for applying indexing features 1431 to a preform 1440 in an illustrative embodiment. According to method 1500, step 1502 includes acquiring a layup mandrel that includes a contoured surface 1412 defining a shape for a preform 1440 that will be hardened into a composite part, such as structure 120. Step 1504 includes identifying surface features 1430 disposed at predefined locations on the contoured surface 1412 that will be at (e.g., covered or surrounded by) the preform 1440. Step 1506 includes conforming the preform 1440 to the contoured surface 1412. In one embodiment, the conforming operation causes the surface features 1430 to apply indexing features 1431 to the preform 1440. This may include pressing the preform 1440 onto surface features 1430 in the form of protrusions or holes. In further embodiments, the indexing features 1431 are applied to the preform 1440 via other means. This may comprise laying up the preform 1440 in a manner that causes the preform 1440 to have holes, indents, or protrusions corresponding with the surface features 1430 of the layup mandrel 1400.

Step 1508 includes hardening the preform 1440 into the structure 120, for example via curing the structure 120. The structure 120 is then demolded from the layup mandrel, and the layup mandrel is returned for cleaning and receiving a preform 1440 for another structure 120.

Step 1509 comprises applying indexing features 1431 to the structure 120. In one embodiment this comprises drilling, milling or trimming into potted holes in the mandrel. The potted holes accommodate drilling and/or milling through a manufacturing excess of the structure 120 and into the layup mandrel, without damage to the layup mandrel. The potted holes are resurfaced prior to any subsequent use at the layup mandrel. The structure 120 may further be trimmed to exhibit a bearing edge (e.g., prior to demolding or after demolding) and demolded.

Step 1510 comprises demolding structure 120 from the layup mandrel 1400.

Step 1511 includes transporting the structure 120 by its bearing edge along a track. In one embodiment, the structure 120 proceeds through an NDI inspection station that characterizes the part. The scan may be acquired via micro pulsing techniques described above, or may be performed during a full pulse wherein the structure 120 is advanced by at least its length in a process direction.

Step 1512 includes indexing 129 the indexing features 1431 of the structure 120 to work stations 140 disposed along the track 110, and may be performed via any of the techniques discussed above. In one embodiment, these operations are performed simultaneously across a plurality of work stations 140 to mate with a plurality of indexing features 1431. After the structure 120 has been indexed, step 1514 comprises conveying the characterization of the structure 120 based on the indexing 129 to the work station 140. This operation can be performed by acquiring prior scan information for a portion of the structure 120 after a work station 140 has been indexed to the portion of the structure 120. In one embodiment, a loft of the structure 120 is determined based on the indexing 129, a location of an Inner Mold Line (IML) or an Outer Mold Line (OML) of the structure 120 may be determined based on the indexing 129. Still further, a location on the structure 120 may be determined based on the indexing 129. That is, a characterization of the part may be determined within a tolerance. The structure 120 is known to be built on a layup mandrel that is within a specific tolerance, using a layup process that is within tolerance. Thus, when the structure 120 is final, the structure 120 is demolded and its shape is maintained during transport through pulsed work stations 140, the structure 120 is within tolerance and has a desired loft Thus, indexing 129 is possible with the assumption that schematic or characterization of the part is within tolerance and the structure 120 at the work station 140 is within tolerance. Transporting the structure 120 along the track does not alter a shape of the structure 120 and does not undesirably change the loft.

Figure 16:
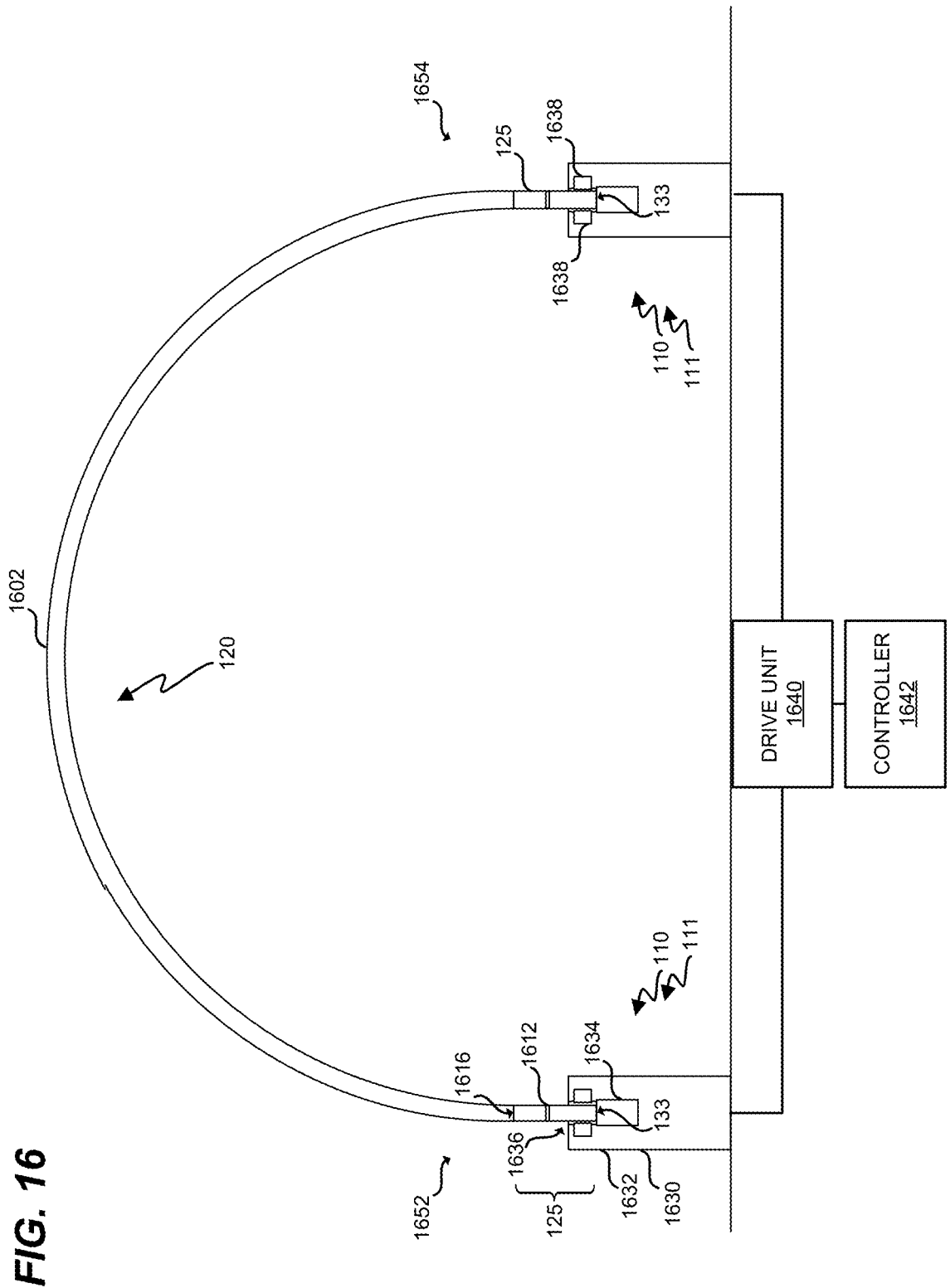
FIG. 16 is an end view of a track supporting a structure in an illustrative embodiment.

FIG. 16 is an end view of a track supporting a structure in an illustrative embodiment. According to FIG. 16, a structure 120 in the form of a half-barrel section of a fuselage is supported by its bearing edge 113 at the manufacturing excess 125 on a left side 1652 and a right side 1654.

Each manufacturing excess 125 includes a boundary 1616, and further includes a bearing edge 113 that is placed in direct contact with a track 110 (specifically, a roller 1634 of the track 110 that facilitates movement in the process direction 199), and bears the weight of the structure 120. The manufacturing excess 125 also includes indexing features 1612. In this embodiment, the track comprises a series of stanchions 1630. Each stanchion 1630 includes prongs 1632, which define grooves 1636 into which a bearing edge 113 of the manufacturing excess 125 is placed. The grooves 1636 help to enforce an IML loft 177 and/or OML loft 175 onto the structure 120, such that a center 1602 of the structure 120 remains above the track 110. Specifically, the grooves enforce IML loft 177 and/or OML loft 175 by enforcing a predefined spacing width between bearing edge 113 on the left side 1652 and the right side 1654. In further embodiments, the grooves 1636 are defined by rollers 1638 (e.g., pinch rollers) mounted in the prongs 1632 on either side of the bearing edge 113. Rollers 1634 directly contact the manufacturing excess 125, and may be driven by a drive unit 1640 (e.g., a motor, chain drive, etc. that drives rollers 1634 and/or rollers 1638) in order to advance the structure 120 forward. The operations of the drive unit 1640 may be controlled via a controller 1642 in accordance with programmed instructions in order to micro pulse 181 or pulse 182 structures in the process direction 199 into the page, or to move them continuously. In this manner, the rollers 1638 drive the bearing edge 113 across the track 110, a left side 1652 of the structure 120 is held in direct contact with the track, a right side 1654 of the structure 120 is held in direct contact with the track, and a center 1602 of the structure 120 remains lofted over the track. In one embodiment, the controller 1642 advances the structure 120 evenly, in order to avoid cocking the structure 120 out of IML loft 177 and/or OML loft 175. In a further embodiment, indexing unit 130 monitor the progression the left side 1652 and the right side 1654 of the structure 120 are advancing evenly without cocking or tilting the structure 120.

Figure 17:
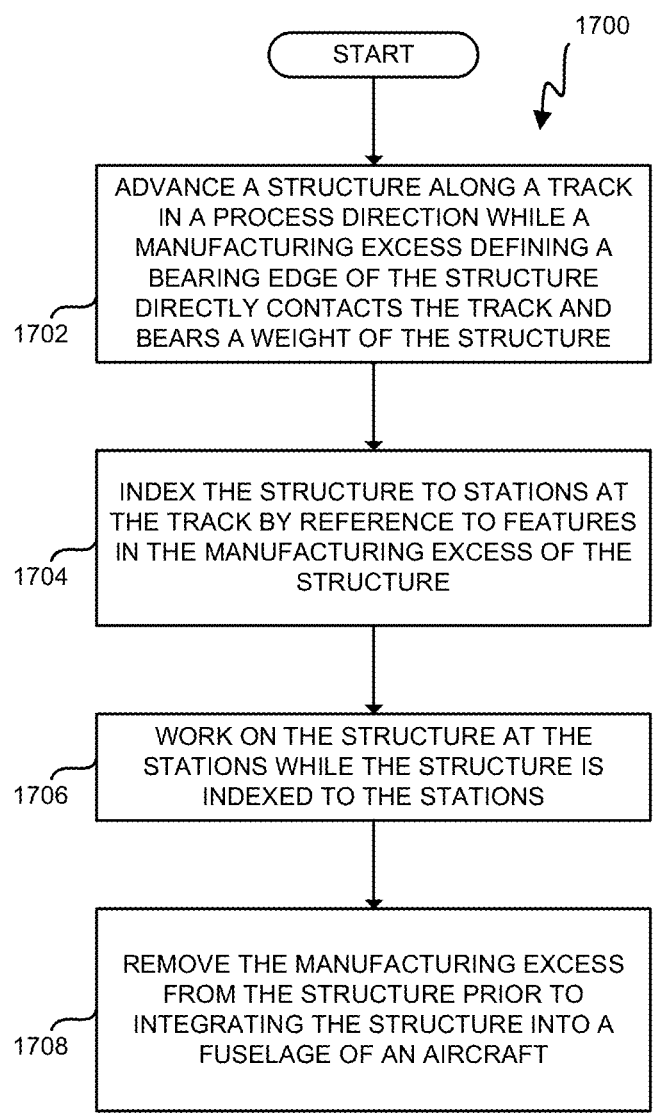
FIG. 17 is a flowchart illustrating a method of transporting a structure by its manufacturing excess in an illustrative embodiment.

FIG. 17 is a flowchart illustrating a method 1700 of transporting a structure 120 by its manufacturing excess 125 in an illustrative embodiment. According to method 1700, step 1702 includes advancing structure 120 along a track 110 in a process direction 199 while a manufacturing excess 125 defining a bearing edge 113 is held in contact with rollers 1634 and/or rollers 1638 throughout the indexing 129, micro pulsing and fabrication process. Bearing edge 113 of the structure 120 directly contacts the track 110 and bears a weight of the structure 120. In one embodiment, advancing the structure 120 comprises driving the bearing edge 113 along rollers 1634 at the track 110. In a further embodiment, advancing the structure 120 applies wear to the bearing edge 113 as the bearing edge 113 is abraded or scratched by the rollers. Thereafter the abraded or scratched bearing edge 113 and manufacturing excess 125 is separated by trimming as part of creating the half barrel section 320 rather than transporting a trimmed edge half barrel section through the micro pulsed assembly process. Therefore, when the manufacturing excess is separated during the formation of the half barrel section 320, this removes any wear that occurred while transporting the structure 120, and leaves a precise part edge for later assembly. Furthermore, if the bearing edge 113 becomes overly worn during transport, the bearing edge 113 may be repaired to the extent necessary to restore a desired level of tolerance/indexing accuracy to the bearing edge 113. This may include bonding or bolting patches into the bearing edge 113. Later, after final trimming, the manufacturing excess 125 is removed and the part achieves desired dimensions for final trim at a joint edge which will be further assembled.

Step 1704 includes indexing 129 the structure to work stations 140 at the track 110 by reference to indexing features 124 in the manufacturing excess 125 of the structure 120. The manufacturing excess 125 may be located along left side 1652 and a right side 1654 of the structure 120. In the region that will be cut out for a window or door, window manufacturing excess 170 and door manufacturing excess 180, the indexing features 124, when present, convey instructions to work stations performing window surround installation, door surround installation and/or window manufacturing excess 170 and/or door manufacturing excess 180 separation. Indexing features 124 are also used in some embodiments, to couple with trimming devices and even to help guide separation of window manufacturing excess 170 and/or door manufacturing excess 180. In such embodiments, the separation of the window manufacturing excess 170 and/or door manufacturing excess 180 operations may even be performed after the manufacturing excess 125 has been trimmed away. This may be performed in a similar manner to the indexing steps provided above for earlier methods.

Step 1706 comprises working on the structure 120 at the work stations 140 while the structure 120 is indexed to the work stations 140. This may be performed in a similar manner to the steps provided above for earlier methods.

Step 1708 includes removing the manufacturing excess 125 from the structure 120 to form a half barrel section 320 prior to joining with another half barrel section 320 into a fuselage of an aircraft. This includes trimming off a bearing edge 113 and any remaining indexing features. This may comprise trimming the manufacturing excess 125 from the structure 120 via a cutter or saw, via a laser or water tool, etc. Removing the manufacturing excess 125 leaves a clean part edge for use during further assembly.

Method 1700 provides a technical benefit over prior systems and techniques, because it enables a large structure to be moved through fabrication, without the need for dedicated support tooling which must be installed, managed and removed. It also allows indexing 129 of the structure 120 at each of multiple work stations using indexing features 124 on the structure 120 itself without additional tooling or jigs. This increases overall manufacturing efficiency and reduces labor.

Figure 18:
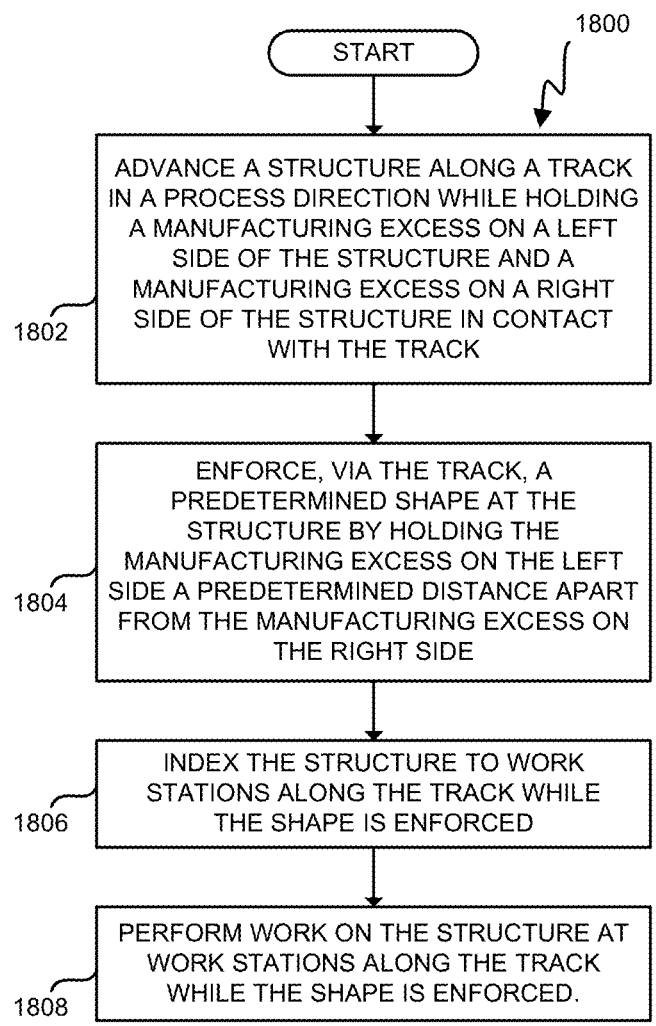
FIG. 18 is a flowchart illustrating a method of enforcing a shape at a structure held by its manufacturing excess in an illustrative embodiment.

FIG. 18 is a flowchart illustrating a method 1800 of enforcing a shape at a structure 120 held by its bearing edge 113 through the manufacturing excess 125 in an illustrative embodiment. Step 1802 includes advancing a structure 120 along a track 110 in a process direction 199 while holding a manufacturing excess 125 on a left side 1652 of the structure 120 and manufacturing excess 125 on a right side 1654 of the structure 120 in contact with the track 110. This may be performed via any of the processes discussed above. Step 1804 includes enforcing, via the track 110, a predetermined shape at the structure 120 by holding the manufacturing excess 125 on the left side 1652 a predetermined distance apart from the manufacturing excess 125 on the right side 1654. Stated another way, the bearing edge 113 on the left side 1652 is maintained at distance apart from the bearing edge 113 on the right side 1654 by track 110 while structure 120 is pulsed or micro pulsed through work stations 140 to maintain a desired IML loft 177 and/or OML loft 175. The desired IML loft 177 and/or OML loft 175 is established on the layup mandrel 1400 and track 110 is set to maintain it while micro pulsing the structure 120 through work stations 140. Furthermore, the contour imparted to the structure 120 (e.g., from a layup mandrel 1400) is carried through the work stations 140, because the IML loft 177 and/or OML loft 175 is enforced by the track 110 without distortion. The predetermined shape may comprise a loft for structure 120, or other desired shape. Enforcing the shape of the structure 120 prior to demold after the demold and micro pulsing through work stations 140 may include placing the manufacturing excess 125 on the left side 1652 of the structure and the manufacturing excess 125 on the right side 1654 of the structure 120 within grooves 1636 at the track 110. Hence, carrying the layup mandrel induced shape of the structure 120 comprises maintaining an arch or other shape while micro pulsing through work stations 140. That is, a desired spacing between sides is maintained without inducing twisting, cocking or other potential distortions.

In step 1806, the structure 120 is indexed to work stations 140 along the track 110 while the shape is enforced, and in step 1808, the work stations 140 along the track 110 work on the structure 120 while the desired IML loft 177 and/or OML loft 175 is enforced. The work performed may be any of the operations discussed above.

Method 1800 provides a benefit over prior techniques, because it enables a large but lightweight structure to be worked upon during transport, while a desired shape of the structure 120 is maintained. This ensures that the work is performed at desired locations at the structure 120, and that the structure 120 does not flex or strain in an undesired manner.

Figure 19:
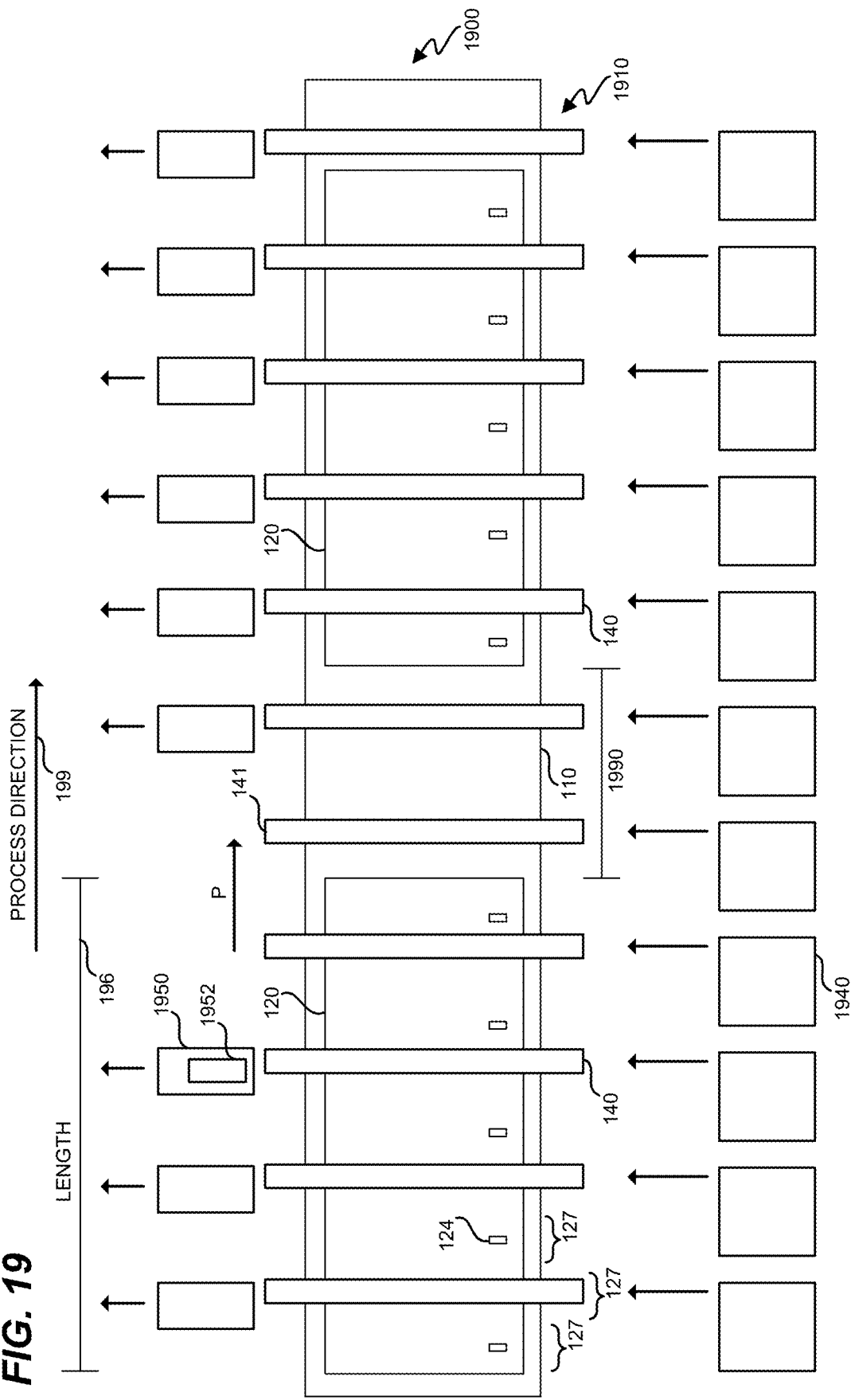
FIG. 19 is a block diagram of an assembly line in an illustrative embodiment.

FIG. 19 is a block diagram of an assembly line 1900 in an illustrative embodiment. The assembly line 1900 is a system for assembling structures such as half-barrel sections of fuselage or wing panels, and includes a track 110, as well as structures 120 arranged along the track 110, the structures comprising indexing features 124. An array 1910 of work stations 140 is disposed along the track 110 that index to the structures 120 and perform work on the structures 120 according to a common takt time. That is, the work stations 140 operate during the same period of time which correlates with a time period between the start of production of one unit of work for a lengthwise portion L of a structure 120 and the start of production of a next unit of work for another lengthwise portion L of a structure 120. In one embodiment, the feeder lines 1940 also progress/fabricate components according to the common takt and/or remove scrap material 1952 from work stations 140 according to the common takt time. The lengthwise portion L of the structures 120 corresponds with a pulse distance P (e.g., a micro pulse 181 distance less than a full length of the structures 120). The work stations 140 are separated from each other in a process direction 199 by less than a length ("LENGTH") 196 of each of the structures 120 in this embodiment in order to enable multiple operations to be performed simultaneously on the structures 120. Feeder lines 1940 supply material to the work stations 140 just in time in accordance with a takt time of the structure 120 along track 110 in assembly line 1900. The feeder lines 1940 can have a takt different from or the same as the takt of the assembly line 1900. Furthermore, each feeder line 1940 can have a unique takt time or can have similar takts to other feeder lines at the assembly line 1900. Meanwhile, chutes 1950 remove scrap material 1952 from the work stations 140 as scrap is accumulated.

In a further embodiment, the work stations 140 perform work during pauses between micro pulses 181 of the structures 120. In another embodiment, the takt time is equal to a length of time during which the structures 120 are paused between micro pulses 181, plus a length of time during which the structures 120 are advanced in a single micro pulse 181 (i.e., length of time during which the structures 120 are paused between micro pulses 181 plus a micro pulse 181 duration). In a still further embodiment, the track 110 drives the structures 120 along a series of rollers 152 mounted to stanchions 1630.

FIG. 20 is a flowchart illustrating a method 2000 of operating an assembly line 1900 in an illustrative embodiment. Assembly line 1900 corresponds with line assembly system 100 and/or line assembly system 300. Step 2002 includes advancing (e.g., micro pulsing) a structure 120 along a track 110 in a process direction 199. In one embodiment, micro pulsing the structure 120 along the track 110 comprises driving the structure 120 along a series of rollers 152 mounted to stanchions 154.

Step 2004 includes indexing 129 the structure 120 to work stations 140 disposed along the track 110. Indexing 129 includes indexing 129 at least a lengthwise portion 127 of the structure within the purview 183 of the work station 140, and may include indexing 129 a single structure, or more than one structure, to multiple work stations during the same indexing cycle (e.g., during the same micro pulse). Step 2006 includes supplying material to the work stations 140 via feeder lines 191-1 (e.g., according to a common takt time). Outflow line 194-3 may also remove material (e.g., according to the common takt) from the work stations 140. Step 2008 includes performing work during pauses between micro pulses 181 of the structure in step 2008 (e.g., according to a common or separate takt times, such as a structure takt time or feeder line takt time). In micro pulsed embodiments, the takt time is equal to a length of time during which the structure 120 is paused between micro pulses 181. The takt time may vary between different components being fabricated, and the length of a takt time for one component may be defined as a known fraction of a takt time for another component. For example, a takt time for frame feeder line 193-2 may be set equal to a takt time for the serial layup line 192-1, divided by a number of frames to be installed at the frame installation work station. In this manner, frames are delivered JIT in order to accommodate a fabrication of a structure 120. More expansively, the takt time for any subcomponent feeder line may be defined as a takt time for the structure 120 into which the subcomponent is installed, divided by the number of subcomponents to be installed into the structure 120 at a particular work station. This concept also applies on multiple levels. For example, a takt for a wing may be based on providing a right and left wing at a takt for an aircraft, a takt for wing stringers may be based on the takt for the wing, a takt for layup material provided to a wing stringer line may be based on the takt for the wing stringers, etc. In further embodiments, takt times are applied not just to feeder lines that supply material to the stations in a just in time manner, but also to outflow lines to ensure that material is removed in a just in time manner Method 2000 provides a technical benefit by enabling fabrication techniques to be applied in a manner that increases fabrication speed, wherein individual feeder lines may operate at the same or different takt times. Furthermore, in some embodiments, each station has a structure input location and a structure output location and feeder line input and/or possible trimmed off material output/exit (e.g., chute).

FIG. 21 is a flowchart illustrating a further method 2100 of operating a line assembly system 100 to fabricate an aircraft in an illustrative embodiment. Method 2100 includes pulsing a series of structures 120 along a track 110 by iteratively advancing the structures 120 and pausing the structures in step 2102. In one embodiment, pulsing comprises iteratively advancing the structures 120 by less than a length 196 of each structure 120, and pausing. In a further embodiment, pulsing the series of structures 120 comprises operating rollers 152 at the track 110. In yet another embodiment, micro pulsing the series of structures 120 comprises advancing it along the track 110.

Step 2104 includes performing work on the series of structures 120 via an array of work stations 140 during pauses between the plurality of micro pulses 181. Work can also be performed by multiple work stations on a structure 120 during the same pause. In one embodiment, the work comprises installing frames onto the structures 120, although any suitable work such as trimming off manufacturing excess, installing window or door surrounds, etc. can be performed. Furthermore, it is possible that multiple work stations could perform work on multiple structures 120 in series at the same time.

Step 2106 includes identifying a scheduled micro pulse 181, and may be performed based on a schedule stored in a memory of a controller. Step 2108 includes performing a work break by the work station 140 during the scheduled micro pulse 181 wherein work is halted within purview 183 by at least one of the work stations 140 of the array of work stations 140. The work stations 140 will periodically stand down when work is not needed to be performed by it on a structure 120 within its purview 183. In one embodiment, the method further includes performing maintenance (e.g., cleaning, replacing parts, etc.) on the halted work station 140 during the break, and/or removing personnel from the work station 140 during the break. In one embodiment, the break in the work occurs at the work station 140 level rather than for all of the work stations 140 that presently have a portion of the structure 120 within its purview 183. Gaps 1990 are maintained between structures 120 allow the work station 141 (FIG. 19) within it to be on halted, thus facilitating a time for station workers to perform maintenance upon work station 141 and/or take a break from working upon structure 120. In one embodiment, each gap 1990 between structures 120 comprises length of a singular or a multiple of a micro pulse 181. Similarly, when a work station 140 is not being used to perform work on a structure (e.g., where a window or door station is opposite a portion of the structure where no window or door is to be installed), utilization of the work station 140 can pause while the work station 140 facilitates a time for work station 141 workers to perform maintenance upon work station 141 and/or take a break from working upon structure 120.

FIG. 22 is a flowchart illustrating a further method of operating a line assembly system 100 in an illustrative embodiment. Step 2202 comprises micro pulsing a structure 120 being assembled from one work station to a next work station via a conveyance 111 (e.g., track 110). Step 2204 comprises coupling an indexing feature 124 of the structure 120 into a complementary feature 134 at the work station 140. Step 2206 comprises conveying, at the moment of indexing 129, to the work station 140 the digitization and/or three dimensional configuration/characterization, including IML loft 177 and/or OML loft 175, of the portion of the structure to be worked upon (within purview 183), without running a scan/rescan of the entire the structure 120 as part of each pulse 182 or micro pulse 181 in order to save time and labor while maintaining quality.

EXAMPLES

In the following examples, additional processes, systems, and methods are described in the context of a line assembly system 100 for structural components.

Referring more particularly to the drawings, embodiments of the disclosure may be described in the context of aircraft manufacturing and service in method 2300 as shown in FIG. 23 and an aircraft 2302 as shown in FIG. 24. During pre-production, method 2300 may include specification and design 2304 of the aircraft 2302 and material procurement 2306. During production, component and subassembly manufacturing 2308 and system integration 2310 of the aircraft 2302 takes place. Thereafter, the aircraft 2302 may go through certification and delivery 2312 in order to be placed in service 2314. While in service by a customer, the aircraft 2302 is scheduled for routine work in maintenance and service 2316 (which may also include modification, reconfiguration, refurbishment, and so on). Apparatus and methods embodied herein may be employed during any one or more suitable stages of the production and service described in method 2300 (e.g., specification and design 2304, material procurement 2306, component and subassembly manufacturing 2308, system integration 2310, certification and delivery 2312, service 2314, maintenance and service 2316) and/or any suitable component of aircraft 2302 (e.g., airframe 2318, systems 2320, interior 2322, propulsion system 2324, electrical system 2326, hydraulic system 2328, environmental system 2330).

Each of the processes of method 2300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 24, the aircraft 2302 produced by method 2300 may include an airframe 2318 with a plurality of systems 2320 and an interior 2322. Examples of systems 2320 include one or more of a propulsion system 2324, an electrical system 2326, a hydraulic system 2328, and an environmental system 2330. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 2300. For example, components or subassemblies corresponding to component and subassembly manufacturing 2308 may be fabricated or manufactured in a manner similar to components or subassemblies produced while the aircraft 2302 is in service. Also, one or more apparatus embodiments, method embodiments, or a combination thereof may be utilized during the subassembly manufacturing 2308 and system integration 2310, for example, by substantially expediting assembly of or reducing the cost of an aircraft 2302. Similarly, one or more of apparatus embodiments, method embodiments, or a combination thereof may be utilized while the aircraft 2302 is in service, for example and without limitation during the maintenance and service 2316. For example, the techniques and systems described herein may be used for material procurement 06, component and subassembly manufacturing 2308, system integration 2310, service 2314, and/or maintenance and service 2316, and/or may be used for airframe 2318 and/or interior 2322. These techniques and systems may even be utilized for systems 2320, including, for example, propulsion system 2324, electrical system 2326, hydraulic system 2328, and/or environmental system 2330.

In one embodiment, a part comprises a portion of airframe 2318, and is manufactured during component and subassembly manufacturing 2308. The part may then be assembled into an aircraft in system integration 2310, and then be utilized in service 2314 until wear renders the part unusable. Then, in maintenance and service 2316, the part may be discarded and replaced with a newly manufactured part. Inventive components and methods may be utilized throughout component and subassembly manufacturing 2308 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A system for assembling structures, the system comprising:
   a track that transports structures comprising indexing features, the indexing features in a manufacturing excess of the structures;
   an array of work stations disposed along the track configured to perform work on the structures and that are separated from each other in a process direction by less than a length of each of the structures; and
   indexing units that are disposed relative to the work stations along the track at known offsets from corresponding work stations in the array, and that comprise complementary indexing features that are located relative to the track, the complementary indexing features being dimensioned to mate with the indexing features;
   wherein the array of work stations are configured to remove the manufacturing excess.

2. The system of claim 1 comprising:
   the indexing features configured to convey a 3D characterization and/or Inner Mold Line (IML) loft and/or Outer Mold Line (OML) loft of the structure within a purview of the array of work stations to the array of work stations.

3. The system of claim 1 wherein:
   the indexing features configured to convey a digitization of the structure within a purview of the array of work stations to the array of work stations.

4. The system of claim 1 wherein:
   the indexing features configured to convey assembly instructions for the structure within a purview of the array of work stations to the array of work stations.

5. The system of claim 1 wherein:
   the track comprises a series of stanchions that include rollers at predefined locations for receiving the structures.

6. The system of claim 1 wherein:
   the indexing features are selected from the group consisting of: through-holes, blind holes, slots, pin, RFID tags and/or bar codes that have been coupled to the structure at predefined intervals.

7. The system of claim 1 wherein:
   each work station of the array of work stations performs is configured to perform a type of work selected from the group consisting of: installing frames, installing stringers, installing door surrounds, installing window surrounds, cutting window holes, and cutting door holes.

8. The system of claim 1 wherein:
   different messages are configured to be conveyed to the array of work stations based upon at least a shape or location of the indexing features.

9. The system of claim 1 wherein:
   each work station of the array of work stations performs is configured to perform work on the structure at the same time.

10. The system of claim 1 wherein:
    the structures are separated by gaps that each comprise a multiple of a micro pulse length.

11. The system of claim 1 wherein:
    the structures are configured to be micro pulsed a distance equal to a multiple of a frame pitch distance.

12. An apparatus for assembling structures, the apparatus comprising:
    a track that advances a structure in a process direction;
    indexing features in a manufacturing excess of the structure;
    at least one work station disposed along the track, the at least one work station configured to perform work on the structure; and
    indexing units that are disposed relative to the at least one work station, the indexing units including complementary indexing features that are located relative to the track, the complementary indexing features being dimensioned to mate with the indexing features;
    wherein the at least one work station is configured to remove the manufacturing excess.

13. The apparatus of claim 12 wherein:
    the indexing units are disposed at offsets from a corresponding at least one work station.

14. The apparatus of claim 12 wherein:
    the at least one work station comprises multiple work stations and the multiple work stations are arrayed serially along the structure that progresses along the track.

15. A system for assembling a structure the system comprising:
    a track that transports structures;
    indexing features in a manufacturing excess of the structures;

an array of work stations disposed along the track, the array of work stations configured to perform work on the structures according to a common takt time; and indexing units that are disposed relative to the array of work stations along the track at known offsets from corresponding work stations in the array;

wherein the structures are separated by gaps that each comprise a multiple of a micro pulse length.

16. The system of claim 15 wherein:
the takt time is equal to a length of time during which the structures are paused between micro pulses plus a length of time during which the structures are advanced between micro pulses.

17. The system of claim 15 wherein:
the takt time is based upon a number of aircraft fabricated per month and a number of assemblies needed per aircraft.

18. The system of claim 15 further comprising:
feeder lines configured to feed into the track based on the takt time.

19. The system of claim 15 wherein:
the array of work stations configured to perform work based upon instructions conveyed by the indexing features at the structures.

20. A system for assembling structures, the system comprising:
a track;
an array of work stations disposed along the track that index to indexing features in manufacturing excesses of structures arranged along the track and configured to perform work on the structures according to a takt time, and that are separated from each other in a process direction by less than a length of each of the structures; and
feeder lines configured to supply material to the array of work stations;
wherein the track is configured to drive the structures along a series of rollers mounted to stanchions.

21. The system of claim 20 further comprising:
an outflow line that is configured to remove scrap.

22. The system of claim 21 wherein:
the outflow line is configured to operate according to the takt time of a half barrel assembly line and the takt time of the outflow line.

23. The system of claim 22 wherein:
the feeder lines are configured to supply material to the half barrel assembly line.

24. The system of claim 23 wherein:
the feeder lines are configured to progress according to the takt time of the half barrel assembly line and the takt time of the feeder lines.

25. The system of claim 20 wherein:
the array of work stations is configured to perform work on the structure during pauses between micro pulses.

26. The system of claim 20 wherein:
the array of work stations is configured to perform work on the structure during micro pulses between pauses.

27. The system of claim 20 wherein:
the takt time is equal to a length of time during which the structures are paused between micro pulses plus a micro pulse duration.

28. The system of claim 20 wherein:
the feeder lines are configured to supply material to the array of work stations in a Just In Time (JIT) manner.

29. The system of claim 20 wherein:
the feeder lines are configured to provide components selected from the group consisting of: frames, stringers, sections of fuselage, and door surrounds.

30. The system of claim 20 further comprising:
an outflow line configured to feed chutes that remove scrap material from the array of work stations.

31. A system for assembling structures the system comprising:
a track;
an array of work stations disposed along the track that index to indexing features in manufacturing excesses of structures arranged along the track and is configured to perform work on the structures according to a takt time, and that are separated from each other in a process direction by less than a length of each of the structures; and
feeder lines configured to supply material to the structures;
wherein the track is configured to drive the structures along a series of rollers mounted to stanchions.

32. The system of claim 31 wherein:
the array of work stations is configured to perform work during pauses between micro pulses of the structures.

33. The system of claim 32 wherein:
the takt time is equal to a length of time during which the structures are paused between micro pulses plus a micro pulse duration.

34. The system of claim 31 wherein:
the array of work stations is configured to perform work during micro pulses between pauses of the structures.

35. The system of claim 31 wherein:
the indexing features at the structures are configured to mate with complementary features at indexing units disposed at the track.

36. The system of claim 31 wherein:
the feeder lines are configured to supply material according to the takt time of the feeder lines and a half barrel assembly line.

37. The system of claim 31 further comprising:
chutes configured to remove scrap material from the array of work stations.

38. A system for assembling structures the system comprising:
a track that transports structures comprising indexing features, the indexing features in a manufacturing excess of the structures;
an array of work stations disposed along the track configured to perform work on the structures and that are separated from each other in a process direction by less than a length of each of the structures; and
indexing units that are disposed relative to the work stations along the track at known offsets from corresponding work stations in the array, and that comprise complementary indexing features that are located relative to the track, the complementary indexing features being dimensioned to mate with the indexing features;
wherein the track comprises a series of stanchions that include rollers at predefined locations for receiving the structures.

39. The system of claim 38 comprising:
the indexing features are configured to convey a 3D characterization and/or Inner Mold Line (IML) loft and/or Outer Mold Line (OML) loft of the structure within a purview of the array of work stations to the array of work stations.

40. The system of claim 38 wherein:
the indexing features are configured to convey a digitization of the structure within a purview of the array of work stations to the array of work stations.

41. The system of claim 38 wherein:
the indexing features are configured to convey assembly instructions for the structure within a purview of the array of work stations to the array of work stations.

42. The system of claim 38 wherein:
the indexing features are selected from the group consisting of: through-holes, blind holes, slots, pin, RFID tags and/or bar codes that have been coupled to the structure at predefined intervals.

43. The system of claim 38 wherein:
each work station of the array of work stations is configured to perform a type of work selected from the group consisting of: installing frames, installing stringers, installing door surrounds, installing window surrounds, cutting window holes, and cutting door holes.

44. The system of claim 38 wherein:
different messages are configured to be conveyed to the array of work stations based upon at least a shape or location of the indexing features.

45. The system of claim 38 wherein:
each work station of the array of work stations is configured to perform work on the structure at the same time.

46. The system of claim 38 wherein:
the structures are separated by gaps that each comprise a multiple of a micro pulse length.

47. The system of claim 38 wherein:
the structures are configured to be micro pulsed a distance equal to a multiple of a frame pitch distance.

48. A system for assembling structures the system comprising:
a track that transports structures comprising indexing features, the indexing features in a manufacturing excess of the structures;
an array of work stations disposed along the track configured to perform work on the structures and that are separated from each other in a process direction by less than a length of each of the structures; and
indexing units that are disposed relative to the work stations along the track at known offsets from corresponding work stations in the array, and that comprise complementary indexing features that are located relative to the track, the complementary indexing features being dimensioned to mate with the indexing features;
wherein the structures are separated by gaps that each comprise a multiple of a micro pulse length.

49. The system of claim 48 wherein:
the array of work stations are configured to remove the manufacturing excess.

50. The system of claim 48 comprising:
the indexing features are configured to convey a 3D characterization and/or Inner Mold Line (IML) loft and/or Outer Mold Line (OML) loft of the structure within a purview of the array of work stations to the array of work stations.

51. The system of claim 48 wherein:
the indexing features are configured to convey a digitization of the structure within a purview of the array of work stations to the array of work stations.

52. The system of claim 48 wherein:
the indexing features are configured to convey assembly instructions for the structure within a purview of the array of work stations to the array of work stations.

53. The system of claim 48 wherein:
the track comprises a series of stanchions that include rollers at predefined locations for receiving the structures.

54. The system of claim 48 wherein:
the indexing features are selected from the group consisting of: through-holes, blind holes, slots, pin, RFID tags and/or bar codes that have been coupled to the structure at predefined intervals.

55. The system of claim 48 wherein:
each work station of the array of work stations is configured to perform a type of work selected from the group consisting of: installing frames, installing stringers, installing door surrounds, installing window surrounds, cutting window holes, and cutting door holes.

56. The system of claim 48 wherein:
different messages are configured to be conveyed to the array of work stations based upon at least a shape or location of the indexing features.

* * * * *

UNITED STATES PATENT AND TRADEMARK OFFICE
CERTIFICATE OF CORRECTION

| | | |
|---|---|---|
| PATENT NO. | : 12,509,247 B2 | Page 1 of 1 |
| APPLICATION NO. | : 18/417819 | |
| DATED | : December 30, 2025 | |
| INVENTOR(S) | : Daniel R. Smith, Darrell D. Jones and Frederick M. Swanstrom | |

It is certified that error appears in the above-identified patent and that said Letters Patent is hereby corrected as shown below:

In the Claims

Column 36, Lines 20-21, Claim 7, correct "work stations performs is configured to perform" to read -- work stations is configured to perform --;
Column 36, Lines 31-32, Claim 9, correct "work stations performs is configured to perform" to read -- work stations is configured to perform --.

Signed and Sealed this
Tenth Day of February, 2026

John A. Squires
*Director of the United States Patent and Trademark Office*